United States Patent
Kanno

(10) Patent No.: US 6,880,653 B2
(45) Date of Patent: Apr. 19, 2005

(54) DRIVE UNIT OF ELECTRIC VEHICLE

(75) Inventor: Nobuyuki Kanno, Iwata (JP)

(73) Assignee: Yamaha Kabushiki Kaisha, Iwata (JP)

( * ) Notice: Subject to any disclaimer, the term of this patent is extended or adjusted under 35 U.S.C. 154(b) by 0 days.

(21) Appl. No.: 10/009,554

(22) PCT Filed: Feb. 28, 2001

(86) PCT No.: PCT/JP01/01536

§ 371 (c)(1),
(2), (4) Date: Mar. 3, 2002

(87) PCT Pub. No.: WO01/63146

PCT Pub. Date: Aug. 30, 2001

(65) Prior Publication Data

US 2002/0104698 A1 Aug. 8, 2002

(30) Foreign Application Priority Data

Feb. 28, 2000 (JP) ........................................ 2000-051115
Jul. 19, 2000 (JP) ........................................ 2000-219538

(51) Int. Cl.⁷ ............................................... B60K 1/00
(52) U.S. Cl. ...................... 180/65.6; 180/65.5; 180/907
(58) Field of Search .............................. 180/65.1, 65.2, 180/65.3, 65.4, 65.5, 65.6, 65.7, 65.8, 412, 413, 907, 908; 301/6.1, 6.5; 280/250.1, 304.1, 304.2; 254/344, 378; 475/83, 107, 72

(56) References Cited

U.S. PATENT DOCUMENTS 3,892,300 A * 7/1975 Hapeman et al. .......... 180/65.5
4,518,057 A    5/1985 McCallum
4,545,567 A * 10/1985 Telford et al. .............. 254/344
5,246,082 A    9/1993 Alber
5,275,248 A *  1/1994 Finch et al. ................ 180/65.6
5,482,305 A *  1/1996 Jeffries et al. ............ 280/304.1
5,722,501 A *  3/1998 Finch et al. ............. 280/250.1
5,878,829 A *  3/1999 Kanno et al. .............. 180/65.5
5,910,060 A *  6/1999 Blume ......................... 475/28
5,921,338 A *  7/1999 Edmondson ................ 180/65.5
5,971,880 A * 10/1999 Keiser ......................... 475/83
6,009,964 A *  1/2000 Ishida ........................ 180/65.8
6,135,909 A * 10/2000 Keiser ........................ 475/107
6,276,475 B1 *  8/2001 Nakanosono .............. 180/65.8
6,338,689 B1 *  1/2002 Pollman ....................... 475/72
6,354,390 B1 *  3/2002 Uchiyama et al. .......... 180/907

FOREIGN PATENT DOCUMENTS

| JP | 36-33814   | 12/1961 |
| JP | 54-89158   | 7/1979  |
| JP | 1-164842   | 6/1989  |
| JP | 9-117476   | 5/1997  |
| JP | 10-151157  | 6/1998  |

* cited by examiner

Primary Examiner—Hau Van Phan
(74) Attorney, Agent, or Firm—Ernest A Beutler

(57) ABSTRACT

A drive unit (54) for an electric motor-operated vehicle is provided with a planetary gear mechanism (58) having; a sun gear (58a) rotating together with a motor output shaft (57a), a planetary gear (58b) meshing the sun gear (58a), and a ring gear (58c) meshing the planetary gear (58b); and constituted that an arm plate (58d) supporting the planetary gear (58b) is rotated with the rotation of the motor (57) at a specified speed reduction ratio. The ring gear (58c) is supported for rotation relative to a housing and a switching mechanism (65) is provided to hold or release the relative rotation of the ring gear (58c).

7 Claims, 19 Drawing Sheets

[FIG. 1]
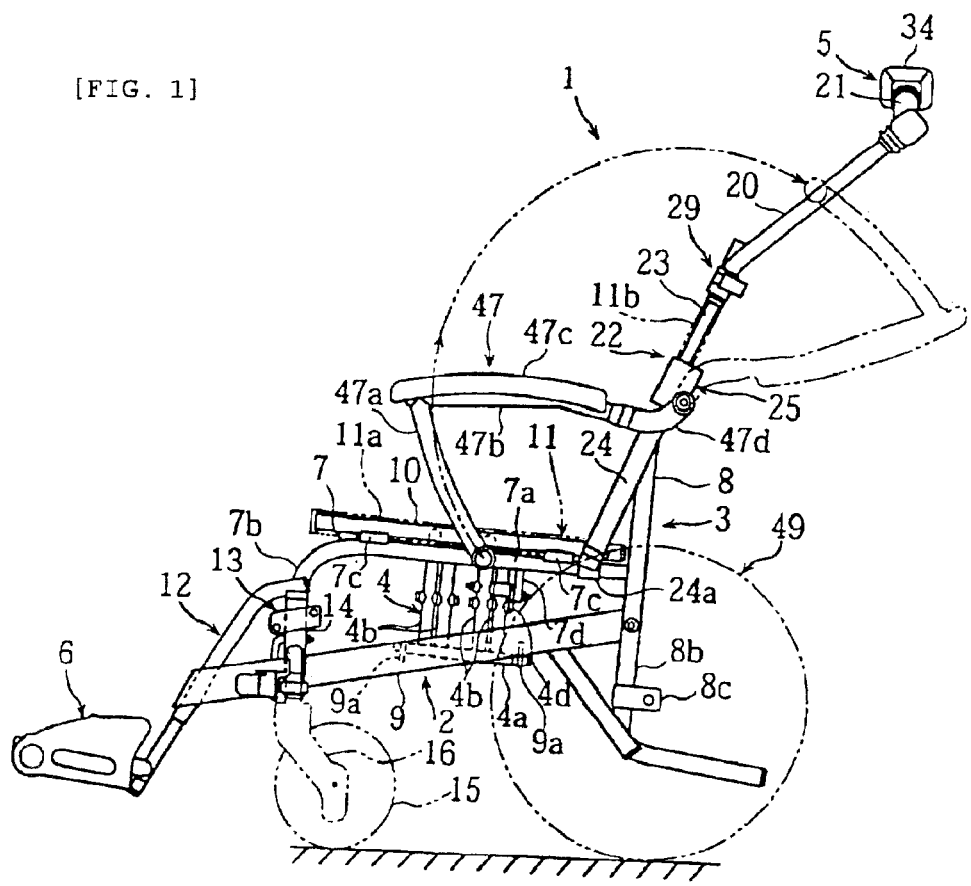

[FIG. 2]
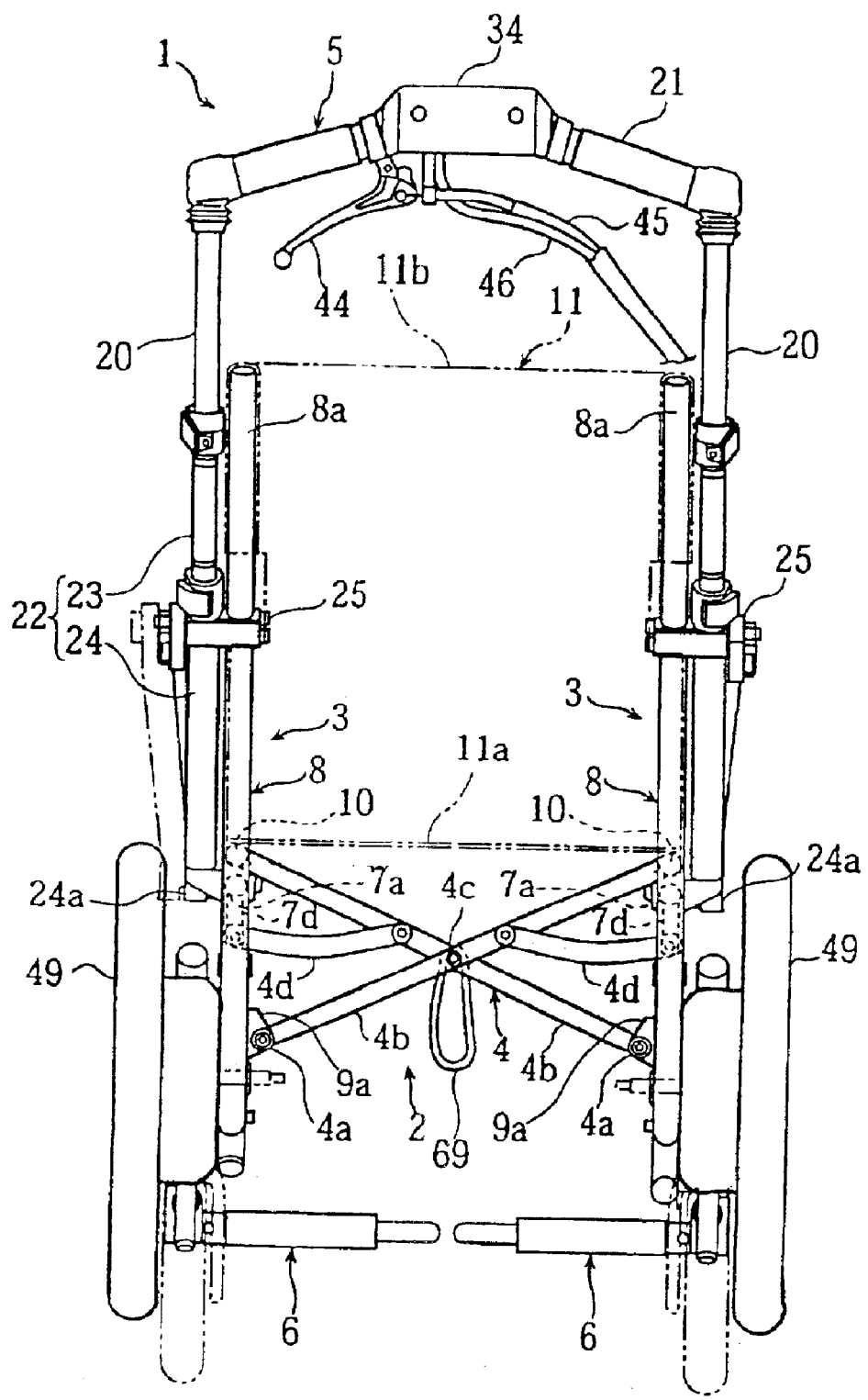

[FIG. 3]
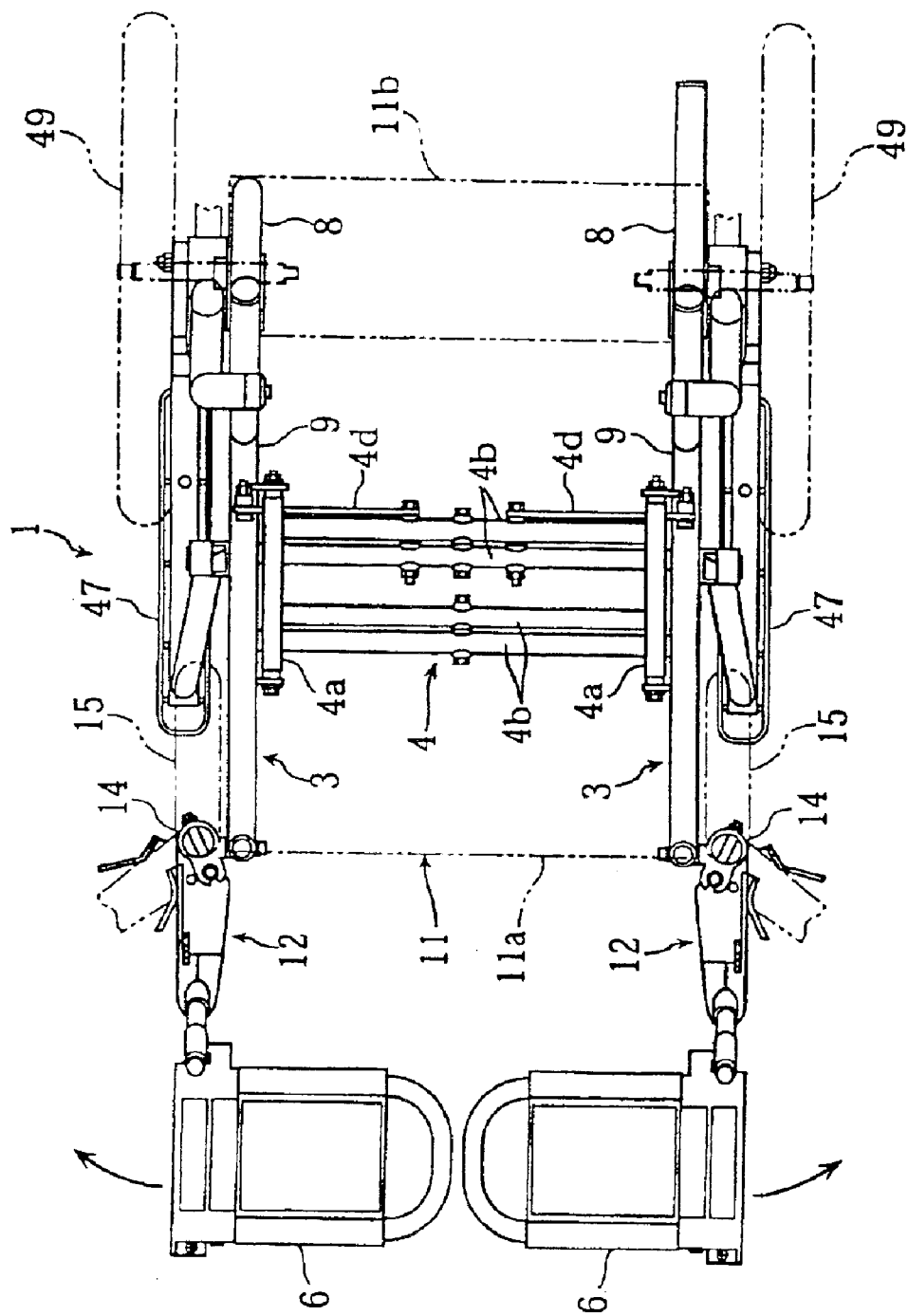

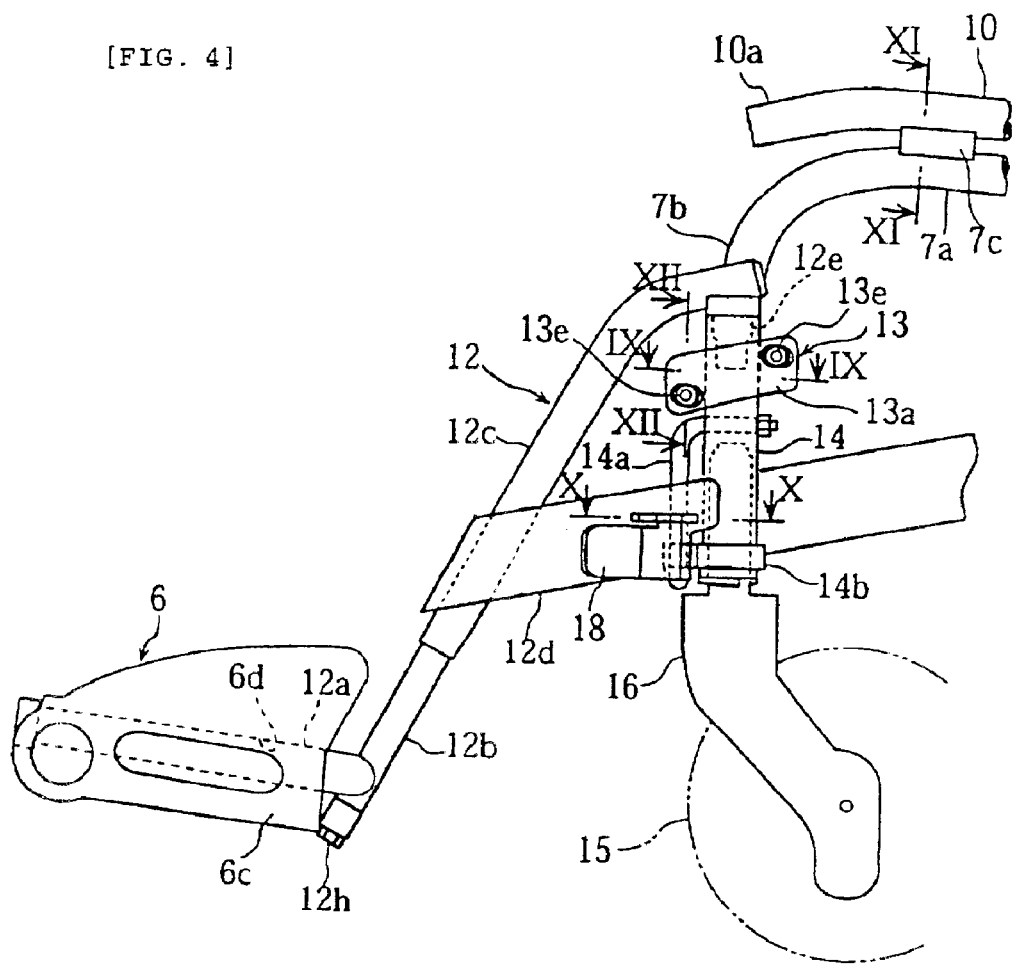
[FIG. 4]

[FIG. 5]
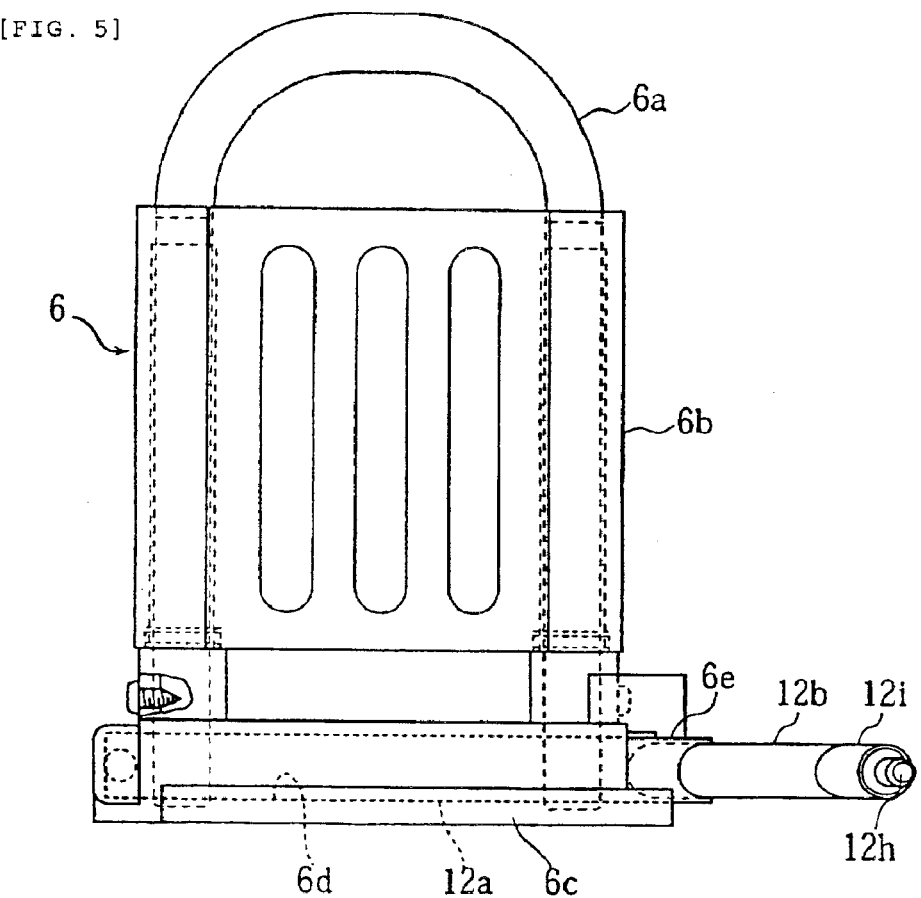
[FIG. 6]
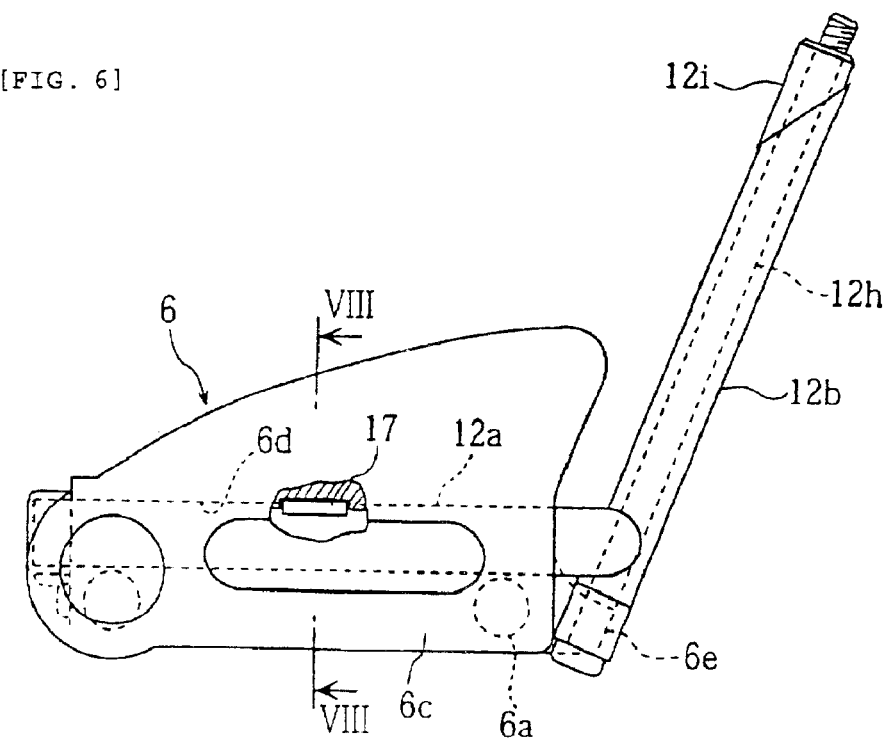

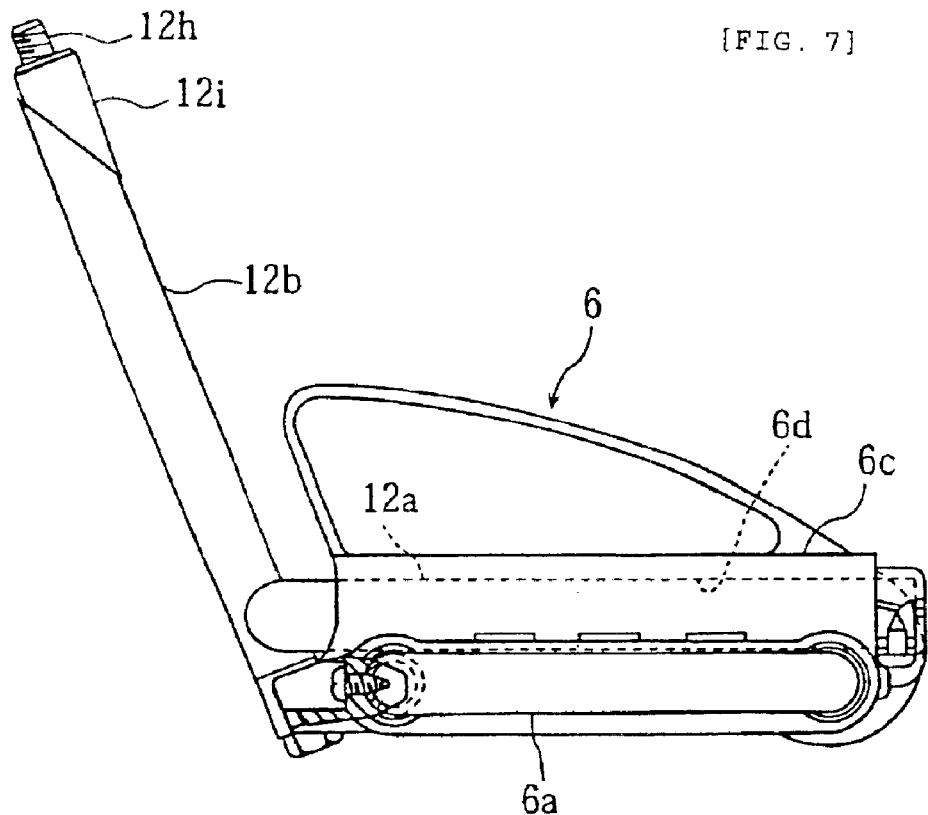
[FIG. 7]
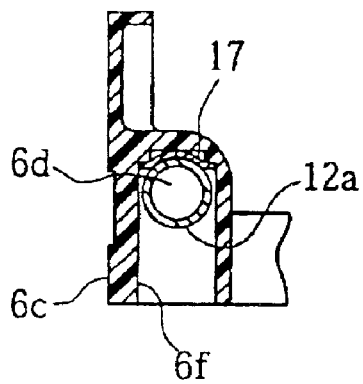
[FIG. 8]
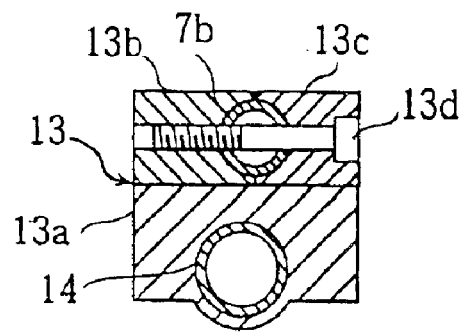
[FIG. 9]

[FIG. 10]
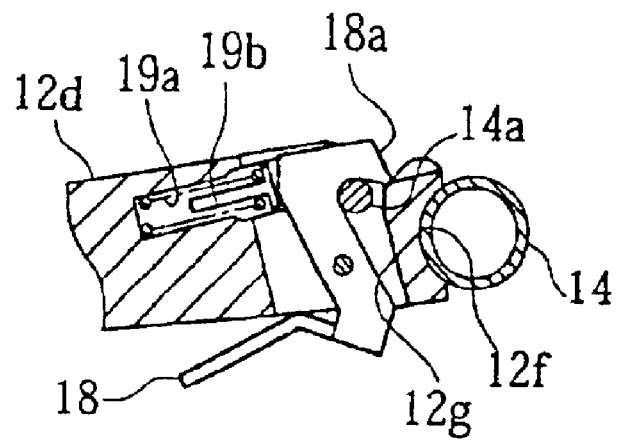
[FIG. 11]
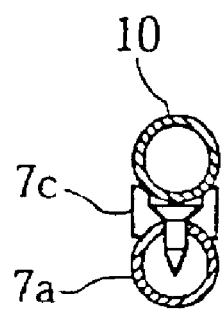
[FIG. 12]
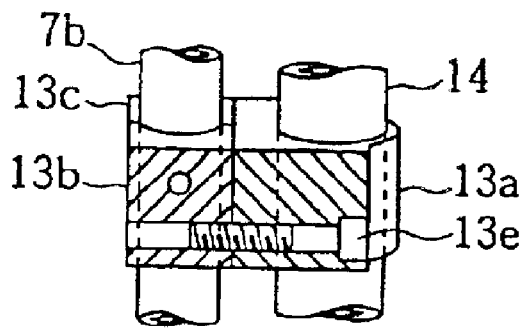

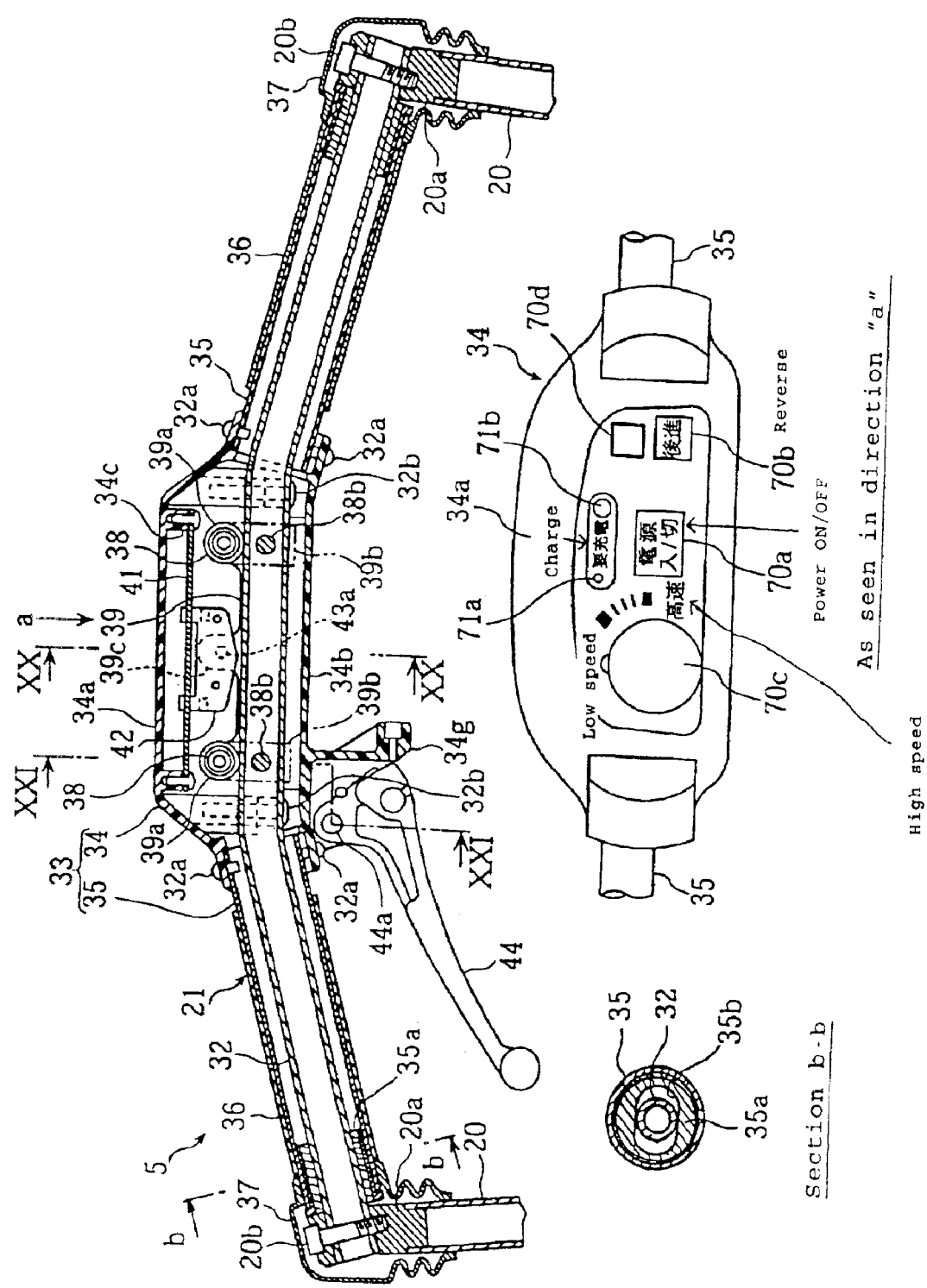
[FIG. 13]

[FIG. 14]
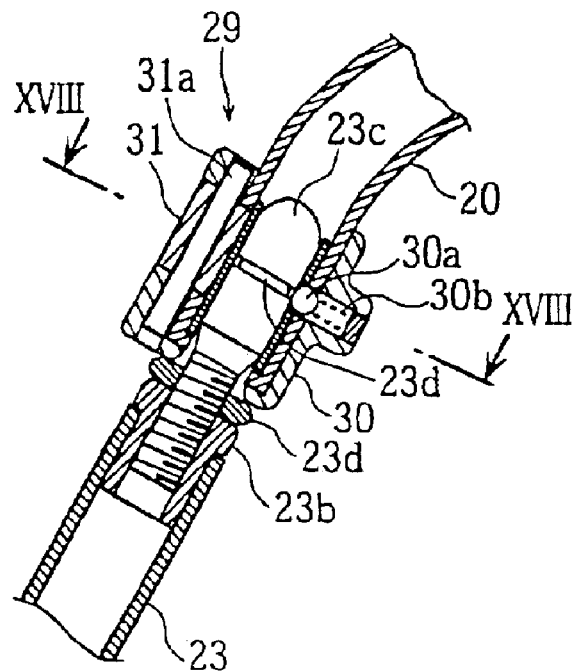
[FIG. 15]
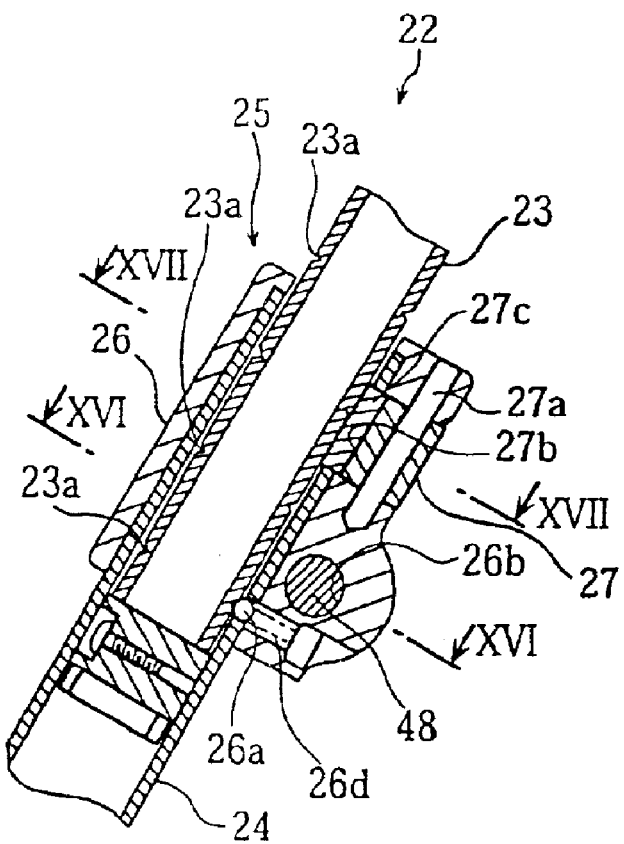

[FIG. 16]
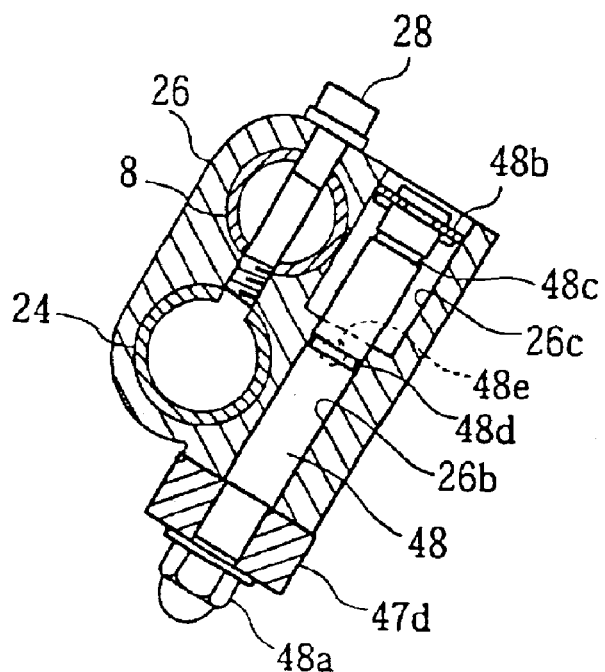
[FIG. 17]
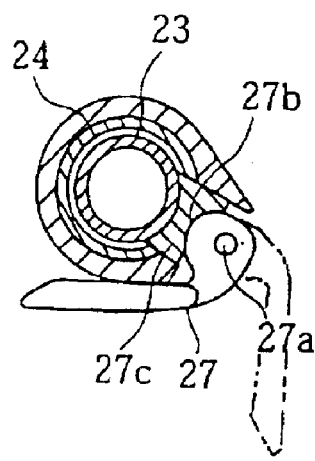
[FIG. 18]
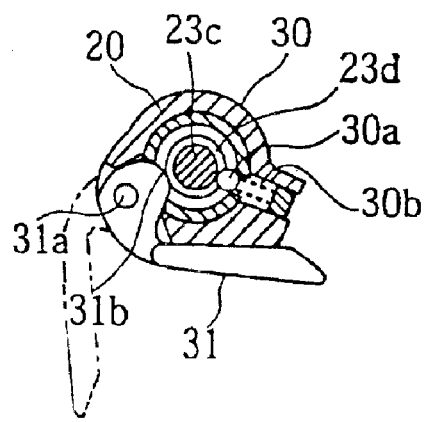

[FIG. 19]
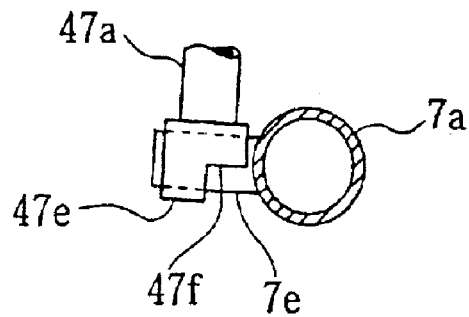
[FIG. 20]
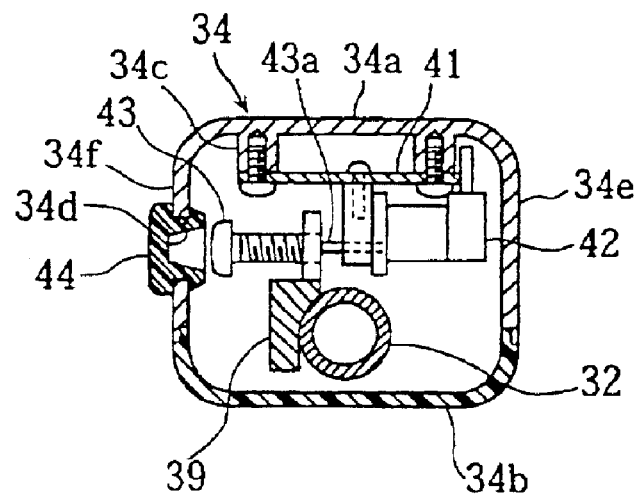
[FIG. 21]
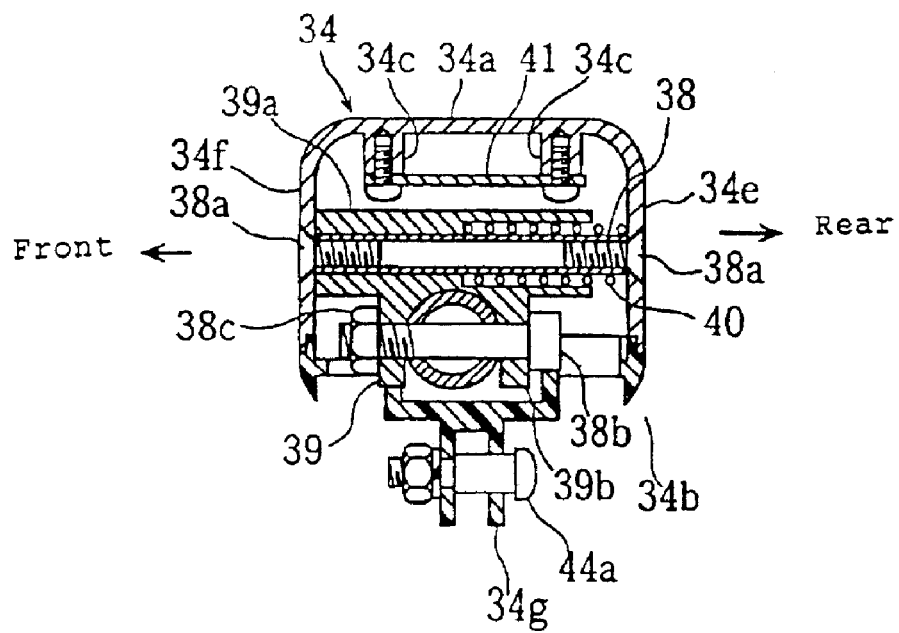

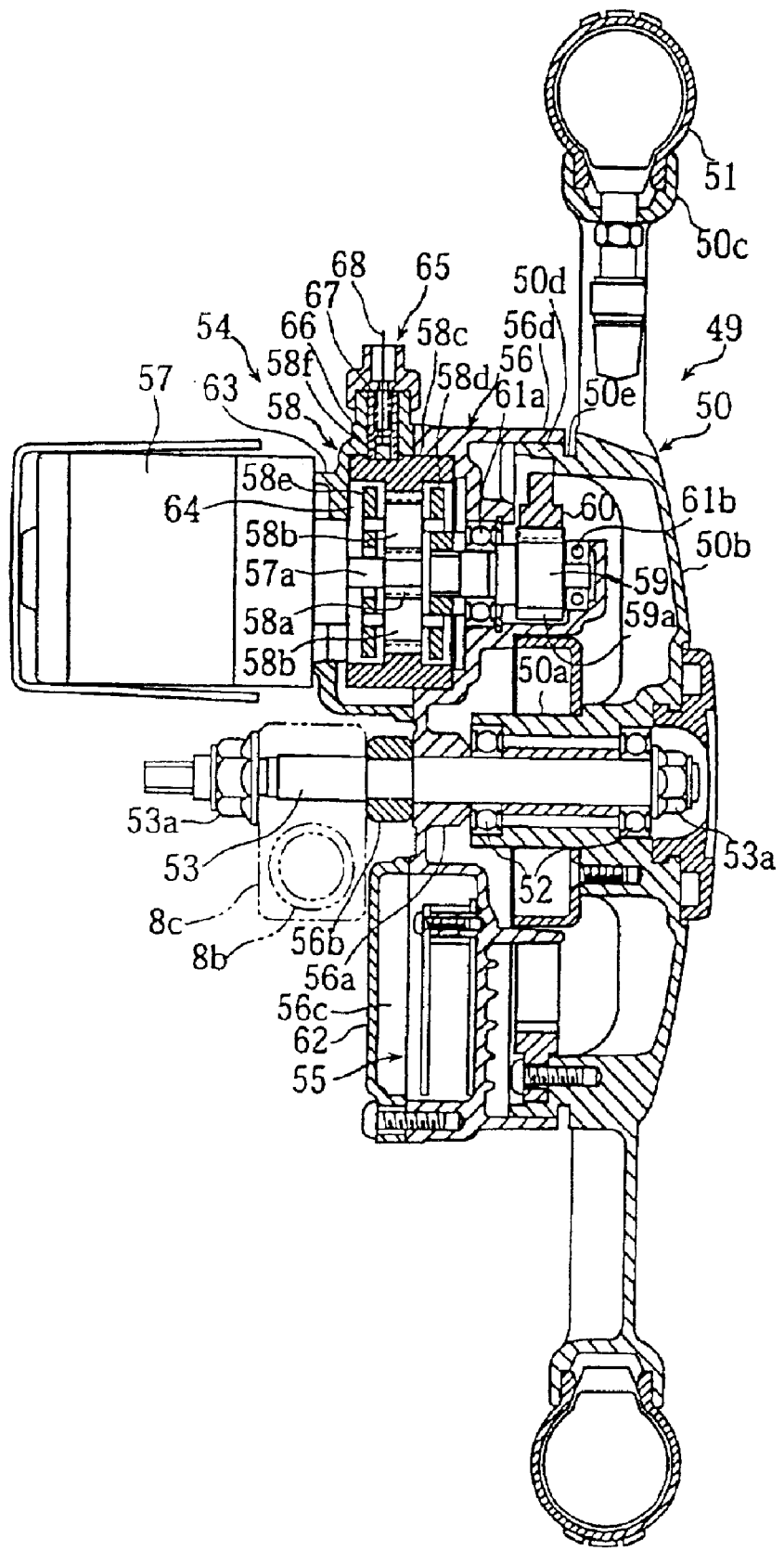
[FIG. 22]

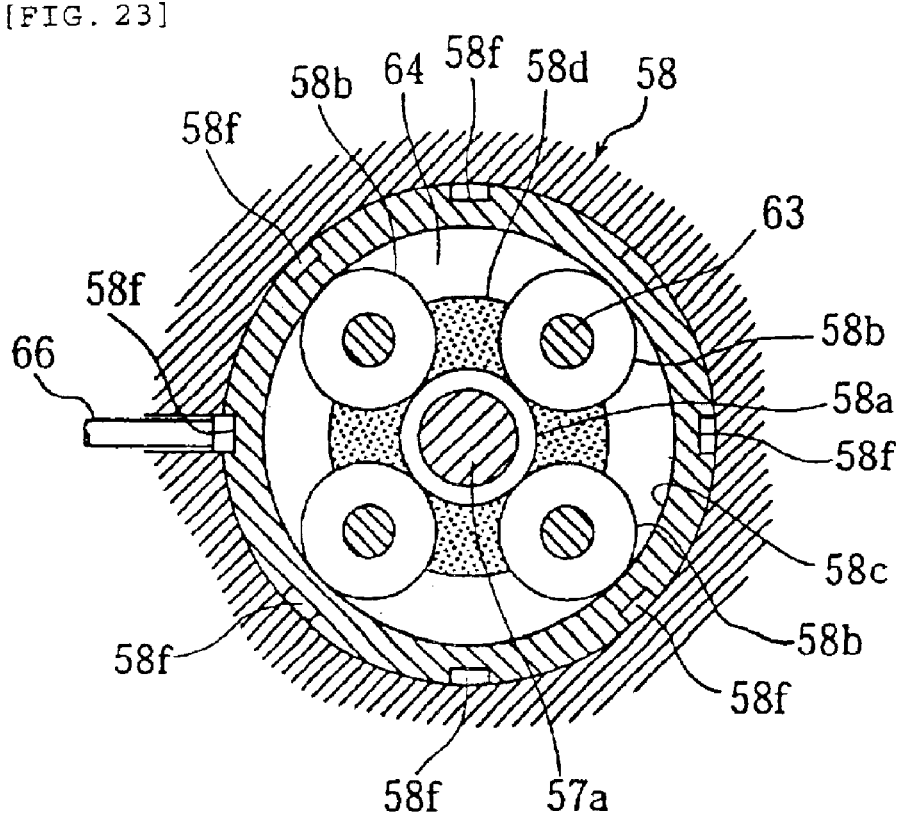
[FIG. 23]

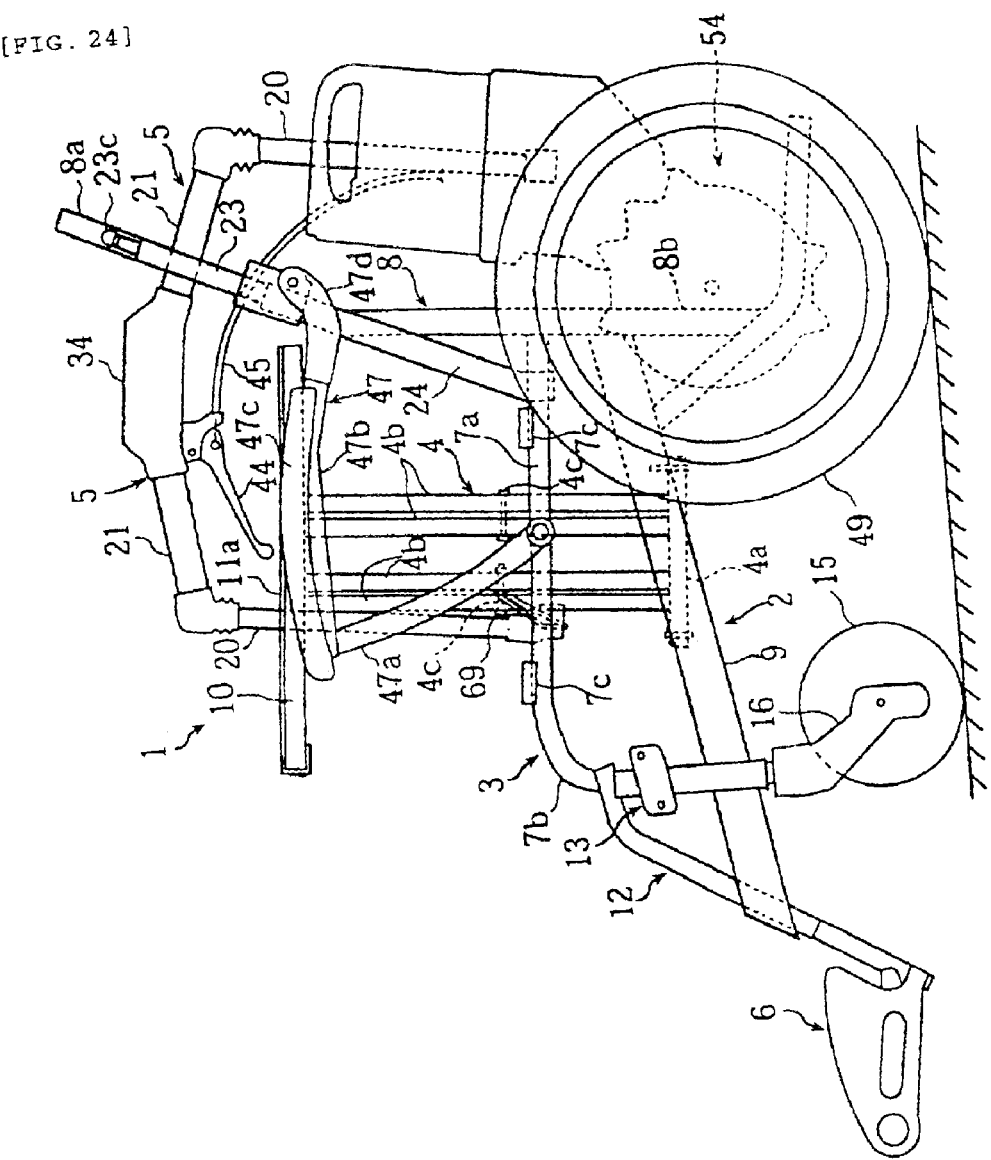
[FIG. 24]

[FIG. 25]
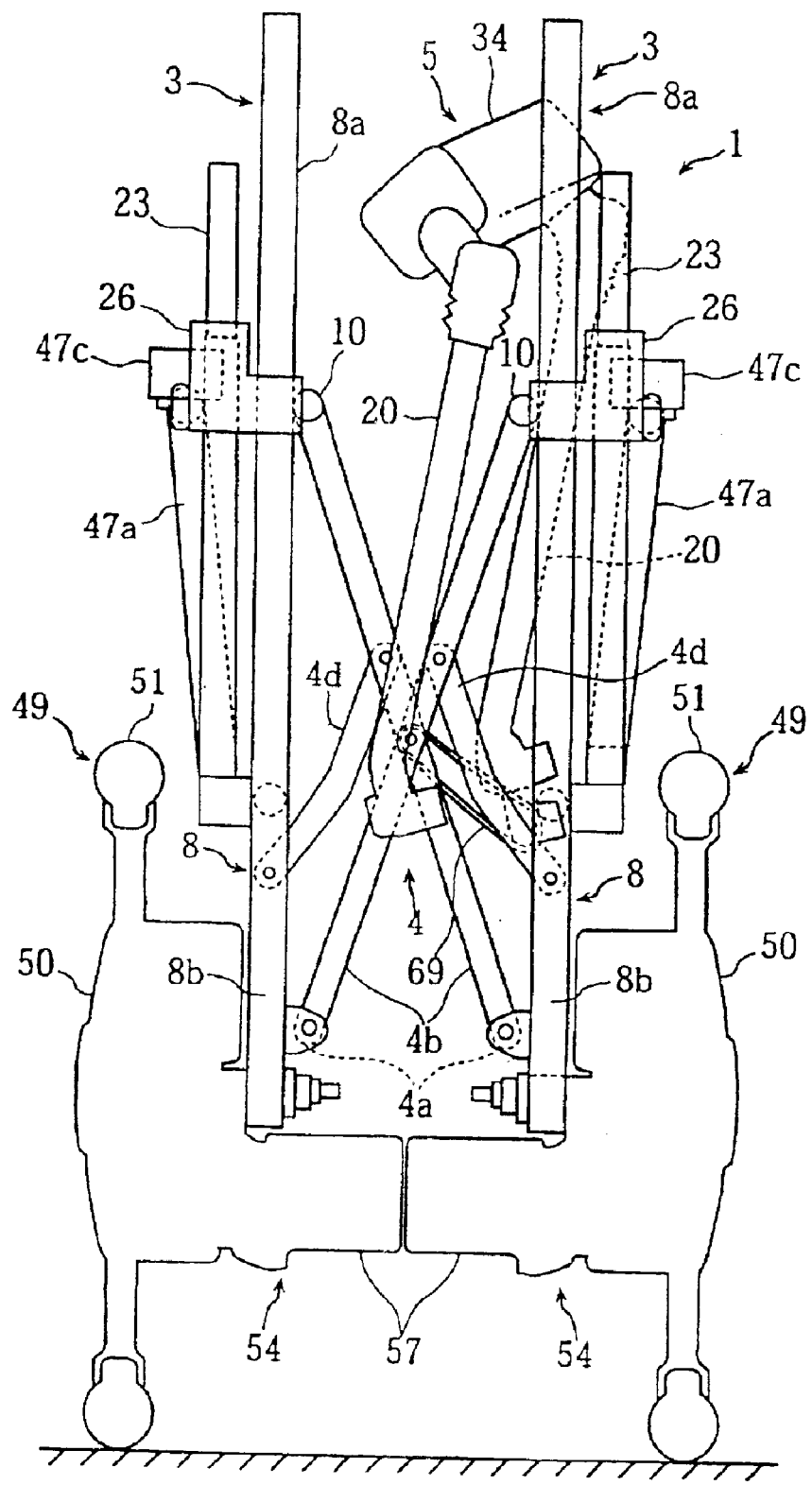

[FIG. 26]
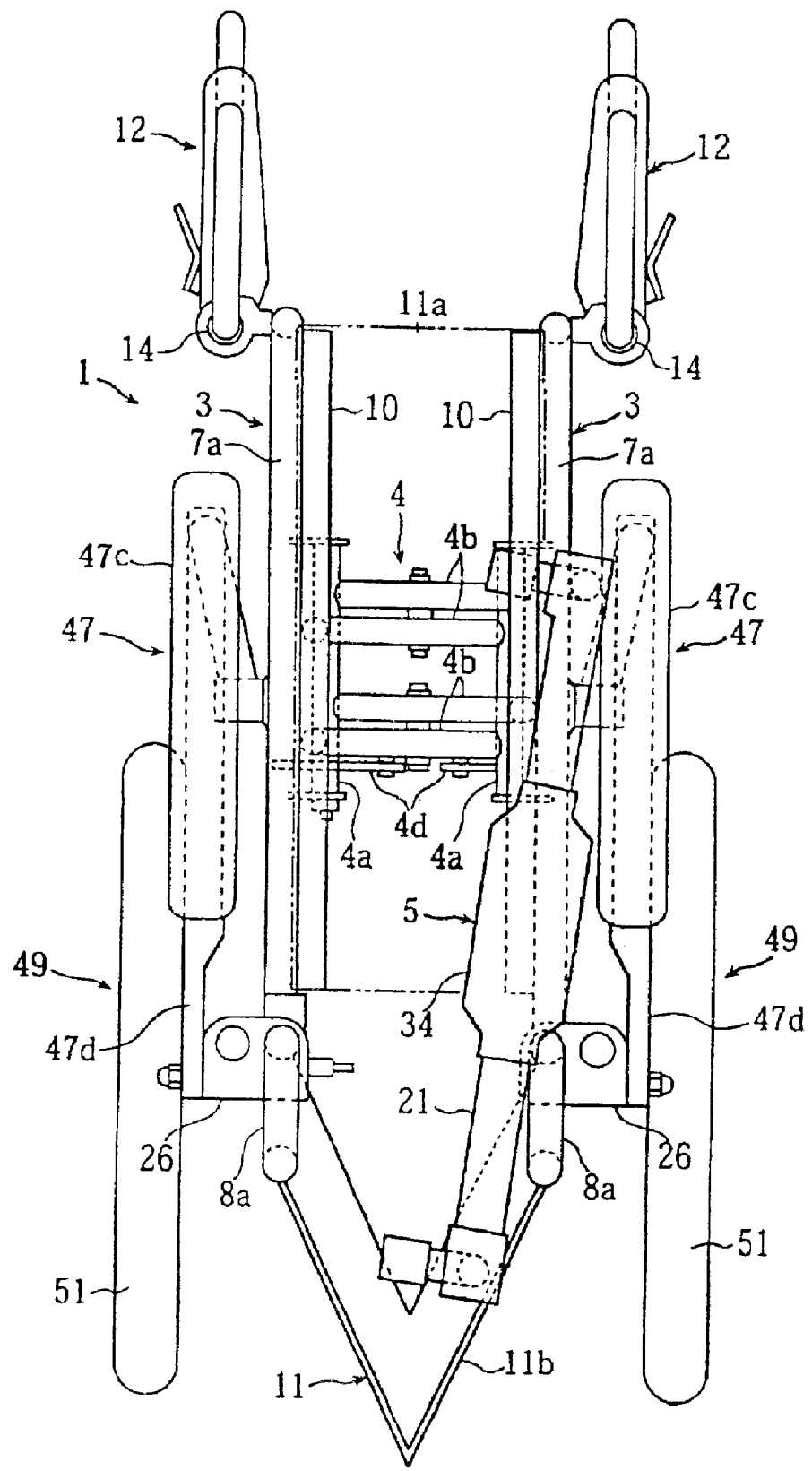

[FIG. 27]
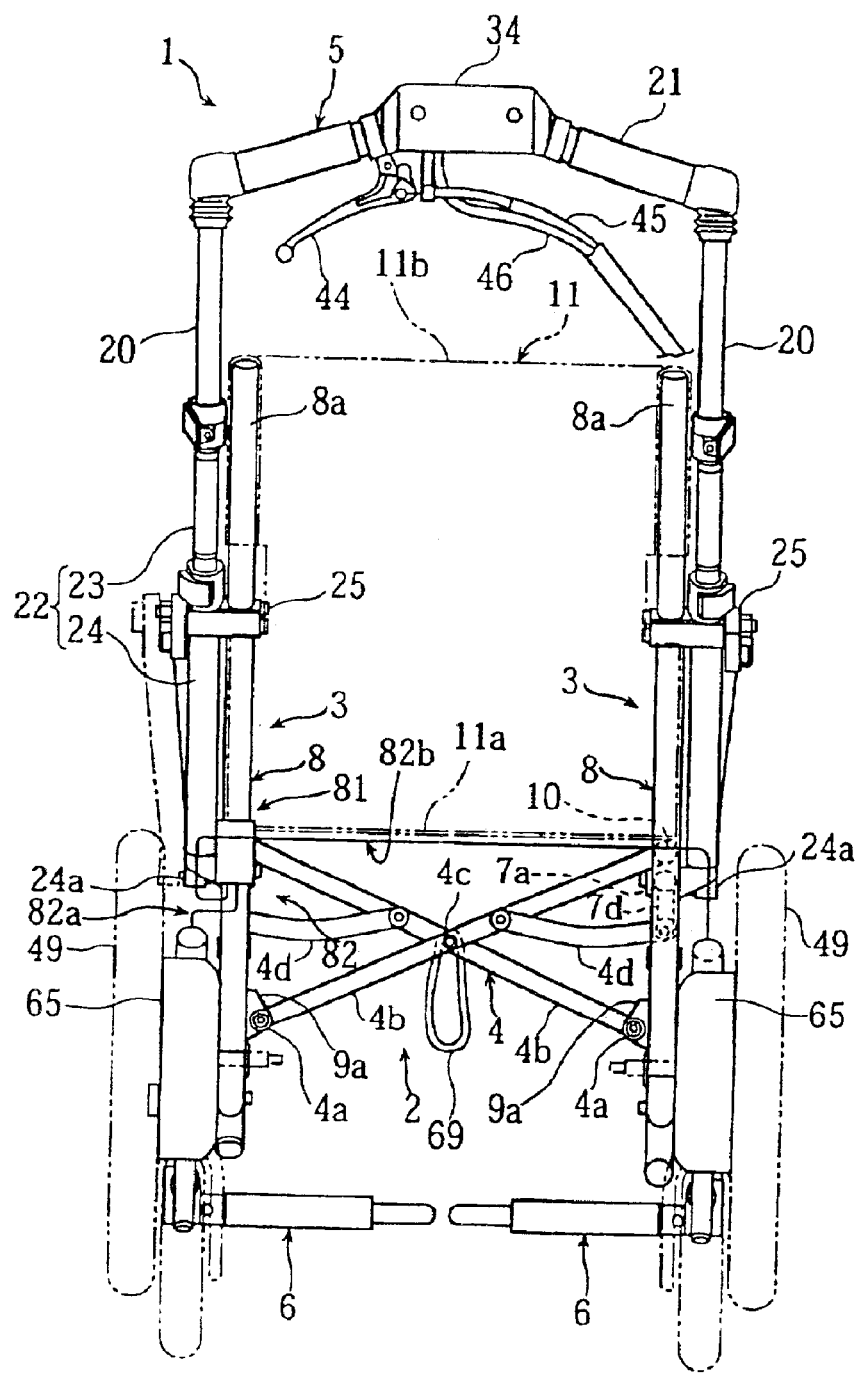

[FIG. 28]
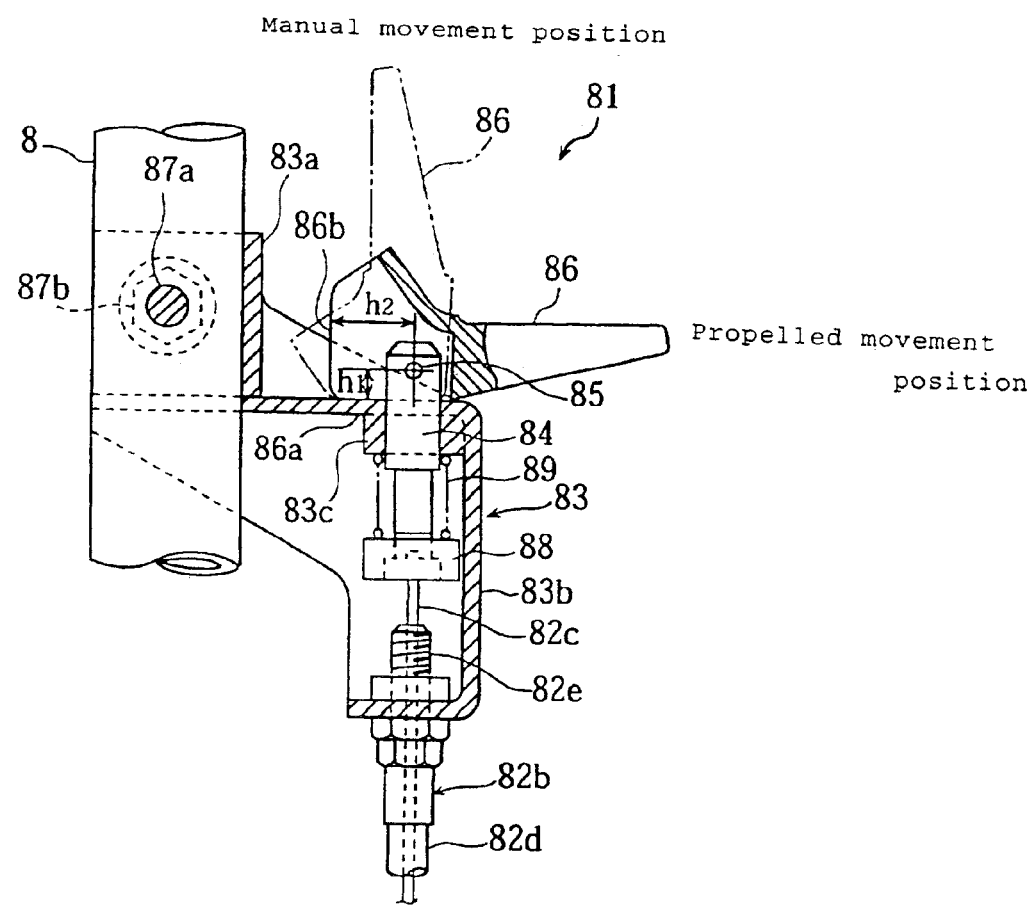

[FIG. 29]
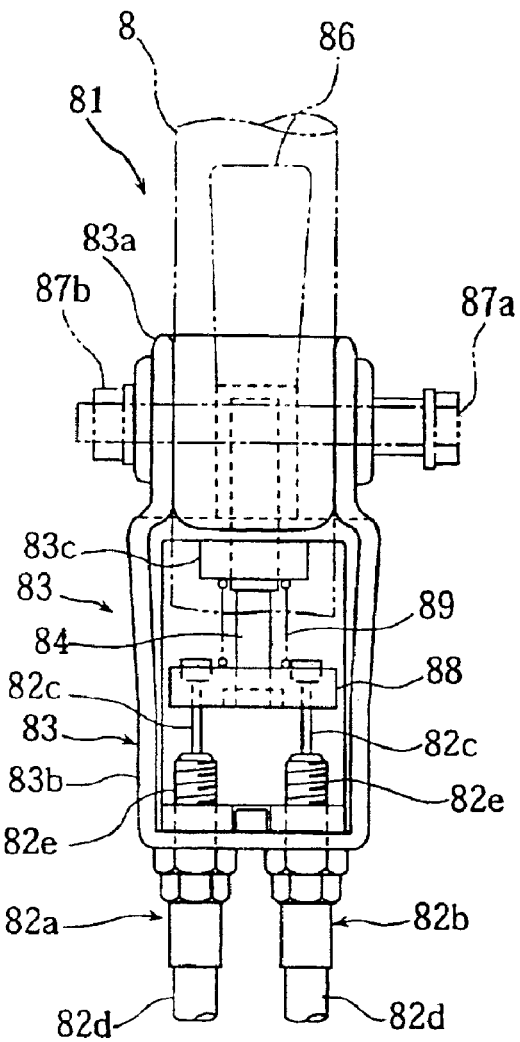
[FIG. 30]
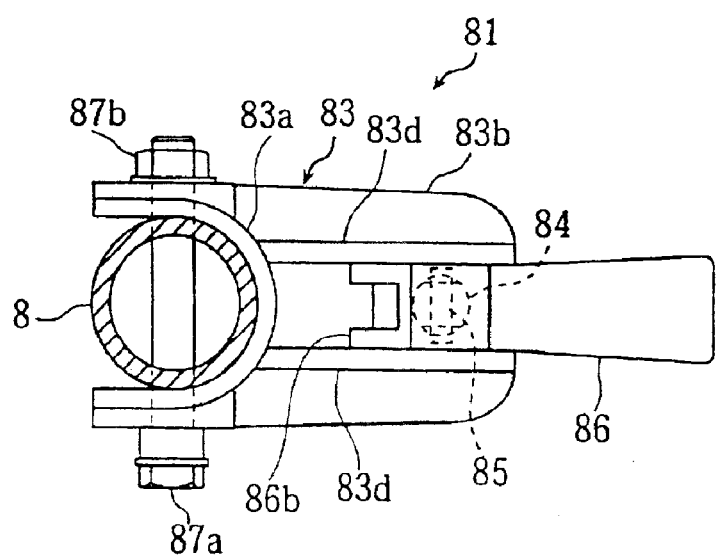

DRIVE UNIT OF ELECTRIC VEHICLE

TECHNICAL FIELD

This invention relates to a drive unit for vehicles propelled with an electric motor, such as the drive unit for electric motor-operated wheelchair of a nursing type, more specifically to the drive unit adapted to facilitate handling the vehicle with its electric motor deactivated.

BACKGROUND ART

In recent years, such wheelchairs have been developed as self-running type of wheelchairs provided with an electric motor operated by a rider using a joystick, and electric motor-assisted type of wheelchairs in which the rider's physical force applied to the handle rims is detected and assisted with an electric driving motor.

Nursing type of wheelchairs have also been conventionally used in which handle grips are attached to the top of right and left back pipes. A type of wheelchair has also been proposed in which an electric motor is mounted on the nursing type of wheelchair, and the value of nursing person's human force applied to the handle grips is detected to assist the human force according to the detected value (JP-A-6-304207).

In the wheelchair of the electric motor-assisted type, the rotation speed of the electric motor is appropriately reduced before being transmitted to the rear wheel. As a mechanism for reducing the rotation speed, for example a planetary gear mechanism is used.

In case the planetary gear mechanism is provided, the wheelchair, when its electric motor is deactivated, cannot be moved lightly by hand because the drive motor, the speed reduction mechanism, etc. work as a resistance. In order to improve the ease of manual handling in the above case, it is a general practice to provide a some type of clutch between the planetary gear mechanism and the rear wheel.

However, providing such a clutch complicates the constitution, and causes the problems of increased size and cost of the drive unit.

In particular from now on, the time is expected to come when aged people take care of aged people, and the wheelchair to be used there will be required of excellent functions for the nursing side. Namely, a wheelchair that is light-weight, compact, easy to handle, and low in price will be in demand.

This invention made in view of the above conventional situation aims at providing a drive unit for electric motor-operated vehicles that is light-weight, compact, and in particular makes it easy to handle the vehicle when its power supply is turned off.

SUMMARY OF THE INVENTION

A first feature of the invention relates to a drive unit for an electric motor-operated vehicle provided with a planetary gear mechanism having; a sun gear rotating together with a motor output shaft, a planetary gear meshing the sun gear, and a ring gear meshing the planetary gear; and constituted that an arm plate supporting the planetary gear is rotated with the rotation of the motor at a specified speed reduction ratio, characterized in that the ring gear is supported for rotation relative to a housing and that a switching mechanism for holding or releasing the relative rotation of the ring gear is provided.

Another feature of the invention also relates to the drive unit for an electric motor-operated vehicle as set forth in the preceding paragraph, characterized in that an output shaft is connected to the axis of the arm plate, a wheel gear fixed to the inside cylindrical surface of a wheel is driven with an output gear formed on the output shaft and that the motor shaft and the output shaft are disposed coaxially.

Still another feature of the invention relates to the drive unit as set forth above, characterized in that the planetary gear mechanism is mounted on each of right and rear wheels, there are provided an operation mechanism mounted on the vehicle frame, and a transmitting system for transmitting the action of the operation mechanism simultaneously to both switching mechanisms of the right and left planetary gear mechanism, and the relative rotation of the ring gears is held or released by the right and left switching mechanism according to the operation of the operation mechanism.

BRIEF DESCRIPTION OF DRAWINGS

FIG. 1 is a left side view of a nursing-type of electric motor-operated wheelchair as an embodiment of the invention.

FIG. 2 is a back view of the wheelchair, as shown in FIG. 1.

FIG. 3 is a bottom view of the wheelchair, as shown in FIG. 1.

FIG. 4 is a left side view of the footrest portion of the wheelchair, as shown in FIG. 1.

FIG. 5 is a plan view of the footrest.

FIG. 6 is a left side view of the footrest.

FIG. 7 is a right side view of the footrest.

FIG. 8 is a sectional view along the line VIII—VIII in FIG. 6.

FIG. 9 is a sectional view along the line IX—IX in FIG. 4.

FIG. 10 is a sectional view along the line X—X in FIG. 4.

FIG. 11 is a sectional view along the line XI—XI in FIG. 4.

FIG. 12 is a sectional view along the line XII—XII in FIG. 4.

FIG. 13 is a front view in section of a bar handle of the wheelchair.

FIG. 14 is a sectional front view of a bar handle attaching-removing mechanism of the wheelchair.

FIG. 15 is a sectional front view of a lock mechanism of an extension-retraction mechanism of the wheelchair.

FIG. 16 is a sectional view along the line XVI—XVI in FIG. 15.

FIG. 17 is a sectional view along the line XVII—XVII in FIG. 15.

FIG. 18 is a sectional view along the line XVIII—XVIII in FIG. 14.

FIG. 19 is a front view of the lower support portion of the armrest of the wheelchair.

FIG. 20 is a sectional view along the line XX—XX in FIG. 13.

FIG. 21 is a sectional view along the line XXI—XXI in FIG. 13.

FIG. 22 is a sectional front view of the rear wheel and the drive unit of the wheelchair.

FIG. 23 is a schematic view of the planetary gear mechanism of the drive unit, as shown in FIG. 22.

FIG. 24 is a left side view of the wheelchair in the folded state.

FIG. 25 is a back view of the wheelchair in the folded state.

FIG. 26 is a plan view of the wheelchair in the folded state.

FIG. 27 is a back view of the layout of the operation mechanism as an embodiment of the invention according to claim 3.

FIG. 28 is a cross-sectional side view of the above operation mechanism.

FIG. 29 is a view of the operation mechanism as seen from the front of the vehicle.

FIG. 30 is a plan view of the operation mechanism.

BEST FORM OF EMBODYING THE INVENTION

Embodiments of the invention will be hereinafter described in reference to appended drawings.

FIGS. 1 to 26 are for explaining an embodiment of the invention. In the figures, the reference 1 is a nursing type of electric motor-operated wheelchair of the present embodiment. To put it roughly, the frame 2 of the wheelchair 1 is foldable, made up of right and left side frames 3, 3 interconnected through a connecting frame 4. A removable, gate-shaped bar handle 5 straddles the rear parts of the right and left frames 3, 3. A footrest 6 which is removable together with a foot bracket 12 is attached to the front pat of each of the right and left side frames 3, 3.

The right and left side frames 3, 3 are constituted in a rough description as follows: The frames 3, 3 are positioned symmetrically on the right and left of the wheelchair. As seen in the side view, an L-shaped seat pipe 7 has a nearly horizontal side stretch portion 7a and a vertical stretch portion 7b curved downward from the front end of the side stretch portion 7a. A vertically extending back pipe 8 is attached to the rear end of the side stretch portion 7a. The lower end of the vertical stretch portion 7b and the lower part of the back pipe 8 are interconnected through a reinforcing pipe 9 extending obliquely up rearward and having an elliptic cross section with its major axis vertical. The intermediate portion between the side stretch portion 7a and the vertical stretch portion 7b is curved in an arcuate shape to be easily gripped by hand when the wheelchair is in the folded state.

Brackets 7c, 7c are attached with an interposed space on the top surface of the side stretch portion 7a. Seat anchors 10 are disposed on the top surfaces of the brackets 7c, 7c. A seat cloth 11 is stretched between the right and left seat anchors 10, 10, with the right and left edges of the seat portion 11a of the seat cloth 11 being secured and supported with the right and left seat anchors 10, 10. The backrest portion 11b of the seat cloth 11 is stretched between the upper parts 8a, 8a of the back pipes 8, with the right and left upper edges of the backrest portion 11b of the seat cloth 11 being stretched between and supported with the right and left upper parts 8a, 8a of the back pipes 8, 8.

The Seat anchor 10 is disposed in over-and-under relation on the side stretch portion 7a. The right and left frames 3, 3 are interconnected to be foldable through the connecting frame 4. To describe it more concretely, support pipes 4a, 4a of the connecting frame 4 are pivoted on the inside surfaces of the right and left reinforcing pipes 9 by means of support bolts inserted into brackets 9a, 9a. To the respective support pipes 4a, 4a are secured the lower ends of two sets of connecting links 4b; one front set of connecting links 4b, 4b and the other rear set of connecting links 4b, 4b. The upper ends of the connecting links 4b, 4b are secured to the seat anchors 10, 10 on respectively opposite sides. The front and rear sets of connecting links 4b, 4b are rotatably interconnected through center pins 4c.

A portion above the center pin 4c of the connecting link 4b and a bracket 7d secured to the side stretch portion 7a of the seat pipe 7 are pivot-interconnected through an intermediate link 4d, on either side. Thus, the wheelchair 1 is made foldable in the vehicle width reducing direction. The intermediate links 4d serve to hold the wheelchair in the state for use.

A holding ring 69 is attached to the center pin 4c of the connecting links 4b, 4b of the front side. The holding ring 69 is made of an endless string such as braided one and, as described later, serves to hold the leg portion 20 of the bar handle 5 when the bar handle 5 is removed and stowed in the folded wheelchair.

In the present embodiment as described above, the lower end of the vertical stretch portion 7b of the seat pipe 7 and the lower part 8b of the back pipe 8 are interconnected through the reinforcing pipe 9 extending obliquely up rearward and having a vertically elongate elliptic cross section. Because the seat pipe 7, the back pipe 8, and the reinforcing pipe 9 form a roughly triangular shape as seen in side view, and because the reinforcing pipe 9 itself has the vertically elongate elliptic cross section which has a large section modulus against bending loads, rigidity of the frame may be increased without much increase in weight.

Moreover, since the front portion of the seat pipe 7 and the back pipe 8 are interconnected through the reinforcing pipe 9 extending obliquely up rearward and having a vertically elongate elliptic cross section with a greater width than other members as seen in side view, the reinforcing pipe 9 becomes an accent in appearance to enhance designing effect.

A caster attaching pipe 14 is secured through a supporting block 13 to the vertical stretch portion 7b of each of the right and left seat pipe 7 in a position outside and parallel to the vertical stretch portion 7b. A bifurcate caster bracket 16 is supported, with the lower end portion of the caster attaching pipe 14, to be rotatably about the axis of the caster attaching pipe 14. A caster (front wheel) 15 is pivoted with the caster bracket 16 (on either side).

The supporting block 13 is made up of an outer block 13a for passing through and securing the caster attaching pipe 14, and two-piece inner blocks 13b and 13c, which squeeze and secure the vertical stretch portion 7b. The inner blocks 13b and 13c are tightened and secured with a bolt 13d passing through the vertical stretch portion 7b. The outer block 13a is tightened and secured to the inner blocks 13b and 13c with bolts 13e.

A footrest 6 is supported with a foot bracket 12 on the caster attaching pipe 14. The footrest 6 is constituted with a U-shape pipe 6a to which a plastic-made footplate 6b is secured. A support pipe 12a passes through a support hole 6d in a base portion 6c of the footplate 6b to support the footplate 6b for movement between a horizontal position for use and an upright position. When the footrest 6 is turned to the use position, a stopper 6e contacts the lower end of the main pipe 12b supporting the support pipe 12a to hold the footrest 6 in the use position.

A plate spring 17 is inserted through a spring insertion hole 6f and disposed on the central top surface of the support hole 6d. The plate spring 17 is in contact with the top surface of the support pipe 12a to force it downward. Thus, the support pipe 12a is constantly in pressing contact with the lower surface of the support hole 6d to prevent the footrest 6 from rattling.

The foot bracket 12 is roughly in an L shape made up of an oblique member 12c to which the main pipe 12b, extending obliquely up rearward toward the upper end of the caster attaching pipe 14, is coaxially joined using a bolt 12h, and a lower stretch member 12d through which the lower part of the oblique member 12c is passed and secured. A wedge 12i is formed at the top end of the main pipe 12b to increase the joining force when the bolt 12h is tightened. The lower stretch member 12d is shaped and disposed to look like, as seen in side view, the direct extension of the reinforcing pipe 9 to improve appearance.

A plastic-made rotary pin 12e provided in the top end portion of the oblique member 12c is inserted into the caster attaching pipe 14 and serves as a rotary shaft. A contact recess portion 12f formed in the rear end of the lower stretch member 12d is made to be in sliding contact with the front face of the caster attaching pipe 14. Thus, both of the foot bracket 12 and the footrest 6 may be attached to or removed from the frame.

A lock lever 18 is rotatably fitted to a through hole 12g of the lower stretch member 12d. An engage-stop claw 18a at an end of the lock lever 18 is adapted to engage with an engage-stop rod 14a when the foot rest 6 is rotated to the use position to lock the footrest 6 in the use position. The engage-stop rod 14a is disposed parallel to the caster attaching pipe 14, with its top end bent in the horizontal direction, made to pass through the caster attaching pipe 14, and is tightened with a nut. The lower end of the engage-stop rod 14a is secured with a nut to a bracket 14b weld-secured to the lower end of the caster attaching pipe 14.

The lock lever 18 is urged with an urging spring 19a in the locking direction through a pressing pin 19b. When the lock lever 18 is turned outward by hand, the footrest 6 may be unlocked together with the bracket 12, may be rotated outward and taken out upward.

The handle bar 5 is made up of right and left leg portions 20, 20 made of round pipe, and an operating section 21 interconnecting the top ends of the leg portions to form a gate shape. The operating section 21 extends from the right or left end toward the center of the vehicle width obliquely upward to generally form an obtuse-angled, inverted V-shape. The bar handle 5 is made adjustable in height and may be attached to or removed from the frame 2 as required. The lower ends of the right and left leg portions 20 are adapted to be attached to or removed from the top ends of inner cylinders 23 of telescopic extension-retraction mechanism 22 attached to the right and left frames 3, 3. The telescopic mechanism 22 is constituted in a straight shape with an outer cylinder 24 being secured to the side frame 3 and with an inner cylinder 23 being inserted for extension and retraction into the outer cylinder 24 so as to be fixed at a specified extended or retracted length.

The lower end of the outer cylinder 24 is secured to the vicinity of the rear end of the side stretch portion 7a of the seat pipe 7 through a bracket 24a, while its upper end is secured to the middle portion of the back pipe 8 through a lock mechanism 25, so as to form, as seen from the rear, a right-angled triangle with the seat pipe 7, the back pipe 8, and the outer cylinder 24 which is the oblique side. Thus, the outer cylinder 24 serves as a reinforcement member of the vehicle body frame.

The lock mechanism 25 is constituted with a lock block 26 fitted over the outer cylinder 24 and secured to the back pipe 8 using a bolt 28, and with a lock lever 27 attached rotatably to the lock block 26 through a pivot pin 27a. A cam 27b is formed around the pivot pin 27a of the lock lever 27. A holder 27c is interposed between the cam 27b and the inner cylinder 23. Engagement grooves 23a at specified spacing are formed in the lower outside circumferential surface of the inner cylinder 23, so that a ball 26a urged with a spring 26d may engage with the engagement groove 23a. Thus, the telescopic mechanism 22 is made rattle-free, and at the same time gives click stop feeling when operated to extend or retract.

When the telescopic mechanism 22 is extended to a required length and the lock lever 27 is rotated to the position shown in solid lines in FIG. 17, the cam 27b presses the holder 27c, so that the inner cylinder 23, or the bar handle 5, is fixed to an intended height in position. When the lock lever 27 is rotated by 90 degrees counterclockwise from the position shown with the solid lines to the position shown with the phantom lines in FIG. 17, the bar handle is unlocked, so that the inner cylinder 23 may be adjusted in height.

An attaching-removing mechanism 29 is provided between the lower end of the leg portion 20 of the bar handle 5 and the upper end of the inner cylinder 23 of the extension-retraction mechanism 22. The attaching-removing mechanism 29 is constituted that a joint rod 23c is screwed into a boss member 23b secured by welding or the like method to the upper opening of the inner cylinder 23 and secured with a nut 23d. A handle cover 30 is secured to the lower end of the leg portion 20. A lock lever 31 is attached, to be rotatably about a rotary pin 31a, to the handle cover 30.

A cam 31b formed around the rotary pin of the lock lever 31 is adapted to come into direct contact with the joint rod 23c. An engage-stop groove 23d is cut around the outside cylindrical surface of the joint rod 23c, so that a ball 30a disposed in the handle cover 30 is urged with a spring 30b to engage with. Thus, rattling when attaching and removing the bar handle 5 is absorbed, and distinct (click stop) feeling is provided.

When the lock lever 31 is turned to the position shown with solid lines in FIG. 18, the cam 31b comes into pressing contact with the joint rod 23c, so that the bar handle 5 is attached to the frame 2. When the lock lever 31 is rotated by 90 degrees clockwise from the position shown with the solid lines to the position shown with the phantom lines in FIG. 18, the lock is unlocked, so that the bar handle 5 may be removed.

The operating section 21 of the bar handle 5 is constituted with combination of an inner pipe (securing section) 32 and a set of outer members (movable sections) 33 to permit relative displacement which is electrically converted with a signal converter and detected. The inner pipe 32 is made of a single metallic pipe with a slightly elevated central portion and right and left side portions extending outward from the central portion gradually sloping down. To each of the right and left ends of the inner pipe 32 is attached the leg portion 20, 20 through a bar handle bracket 20a and securely tightened with a bolt 20b.

The outer member 33 is constituted with; a handle cover 34 which covers, while leaving a gap, the central portion, with respect to the vehicle width, of the inner pipe 32, and right and left pipes 35, 35, which are supported respectively with bearing (guiding) members 35a provided on both right and left ends of the handle cover 34 so as to cover, while leaving a gap, the right and left portions of the inner pipe 32.

The bearing member 35a is formed with a guide hole 35b of an elliptic cross section that is elongate in forward and rearward directions. In the guide hole 35b is inserted the inner pipe 32. In this way, the outer member 33 is movable in the (front-and-rear) direction of the major axis of the elliptic cross section of the guide hole 35b but immovable in the minor axis direction of the cross section of the guide hole 35b.

Grips 36, 36 made of rubber or the like are fitted over the right and left pipes 35, 35. As the grips 36, 36 are disposed to slope down outward, the palms of a nursing person's hands extended to grip the grips 36, 36 and to operate the bar handle 5 agree well with the sloping angle of the grips 36 to facilitate the operation. A bellows-shaped collar 37 is attached to surround the outer end of the pipe 35 in the vehicle width direction to the part connecting the inner pipe 32 and the leg portion 20.

The handle cover 34 is made up of two separate parts; an upper cover 34a and a lower cover 34b, joined together to form a single body by tightening two bolts 32b, one for each side. The two parts are also secured to the center side ends of the right and left pipes 35, 35, using four bolts 32a, two on each side.

Two guide pipes 38, 38, one for each side, extending in forward and rearward directions, are disposed in the upper cover 34a, spaced symmetrically on both sides of the vehicle's longitudinal center line. The guide pipes 38, 38 are secured to the upper cover 34a using bolts 38a, 38a inserted from outside the upper cover 34a.

Each of the guide pipes 38, 38 supports a guide plate 39 so that its guide cylinder portions 39a, 39a can make back-and-forth, relative movement (sliding). An urging spring 40 is interposed between the inside wall of each guide cylinder portion 39a and the back wall 34e of the upper cover 34a. Here, a relatively large clearance is provided between the inside diameter of the cylindrical portion 39a and the guide pipe 38.

The guide plate 39 is provided with securing flanges 39b so as to straddle the inner pipe 32. The guide plate 39 is secured to the inner pipe 32 with a bolt 38b inserted to pass through the flanges 39b and the inner pipe 32, and with a nut 38c.

As described above, the outer member 33 is supported with the inner pipe 32 to be relatively movable only in the (back-and-forth) direction at right angles to the axis of the pipe and is urged toward the rear by means of the urging spring 40. Here, the inside surface of the forward wall 34f of the upper cover 34a contacts the front end surface of the cylindrical portion 39a to determine the rear end position of the outer member 33. The inner pipe 32 is supported with the elliptic-cross-sectional guide hole 35b of the bearing member 35a, so that the guide hole 35b permits the outer member 33 to move only in the back-and-forth directions. Also as described above, since a relatively large clearance is provided between the guide pipe 38 and the cylindrical portion 39a, in case for example only the right hand side grip 36 is pushed, the outer member 33 swings about the left hand side bearing member 35a with the right hand side pushed forward, obliquely as seen from above.

A base plate 41 for supporting electric components such as sensors is secured with bolts to the boss portions 34c extending downward from the ceiling inside surface of the upper cover 34a. A sensor 42 comprising of a direct motion type potentiometer is attached to the underside of the base plate 41. A detecting needle 43a is located to face the sensor 42. The detecting needle 43a of the sensor 42 is directed toward an end of an adjustment bolt 43 screwed into the sensor flange portion 39c of the guide plate 39, so that the initial detection value may be adjusted by adjusting the screwing amount of the adjustment bolt 43. Incidentally, the reference numeral 44 stands for a plug for opening and closing the screwing amount adjustment hole 34d of the adjustment bolt 43 formed on the upper cover 34a.

When the right and left grips 36, 36 of the outer member 33 are pressed, the sensor 42 makes relative forward displacement, and assisting power commensurate with the displacement is produced. At this time, if the right hand side grip 36 only for example is pressed, the outer member 33 swings to an oblique attitude, and the amount of relative displacement of the sensor 42 is smaller than when both of the right and left hand side grips 36, 36 are pressed. As a result, the assisting power at the time of turning operation is smaller than that at the time of straight movement, which means improved ease of operation.

On the upper cover 34a are seen; a power switch 70a, a reverse switch 70b, a speed controller 70c, a clutch shift switch 70d (for shifting clutch function, to be described later), a power display 71a, and a display 71b for indicating the necessity of charging. They are collectively mounted on the top surface of the base plate 41.

The underside wall of the lower cover 34b has an integrally-formed lever holder 34g which pivots a brake lever 44 for swinging movement about a fitting bolt 44a. A brake cable 45 attached to the brake lever 44 is routed, bundled together with a wire harness 46 connected to the above electric components for power supply and signal takeout, along a right hand side leg portion 20, and connected to right and left drive units 54 which will be described later. Thus, when the brake lever 44 is operated, right and left rear wheels are broken simultaneously. Incidentally, the above wire harness 46 may be alternatively routed through the interior of the bar handle 5.

As described above, this embodiment is arranged with the bar handle 5 made in the gate shape straddling the rear parts (rear frames) of the side frames 3 and its height is made adjustable. Therefore, the height of the bar handle 5 may be adjusted to match the nursing person, so that the wheelchair 1 is easily moved around by gripping and pushing the operating section (upper side portion) 21 of the gate shape handle.

Moreover, since the bar handle 5 is made removable, the entire wheelchair 1 may be folded without problem, although the bar handle 5 is made in the gate shape. Another point is that, since the handle accommodating section is provided on the vehicle body, the bar handles 5 removed when folding the wheelchair may be neatly accommodated, so that the bar handle 5 cannot be lost.

Steps of folding the wheelchair will be described according to FIGS. 24 to 26. To fold the wheelchair 1, first the lock handle 31 of the attaching-removing mechanism 29 is turned clockwise by 90 degrees from the position shown in FIG. 18. As this step unlocks the cam 31b, the leg portion 20 is pulled up to remove the bar handle 5. The footrest 6 is turned up and the connecting links 4b, 4b are turned upward about the support pipes 4a. By this step, the wheelchair 1 is folded up to the state in which the right and left motors 57 are in mutual contact. The bar handle 5 that has been taken out as described above is stowed in the wheelchair 1, with one leg portion 20 located in front and the other leg portion 20 in the rear. Here, the leg portion 20 on the front side is supported as suspended with the holding loop 69 while the leg portion 20 on the rear side is supported as inserted into the seat-back portion 11b of the seat cloth 11.

Moreover, since the brake lever 44 is attached to the bar handle 5, the bar handle 5 remains connected to the vehicle body with a brake cable 45 even if the bar handle 5 is removed. Therefore, the bar handle 5 cannot be lost when it is removed.

Armrests 47 are attached to right and left sides of the frame 2. Each armrest 47 is made up of a leg portion 47a extending upward with a slight forward list, an arm portion 47b extending generally horizontally rearward from the top end of the leg portion 47a, and a cover 47c disposed over the arm portion 47b.

A support bracket 47d in a downward bulging arcuate shape is connected to the rear end of the arm portion 47b. The rear end of the support bracket 47d is pivoted with the lock block 26 of the telescopic extension-retraction mechanism 22 to be capable of rotation and also movable in the vehicle width direction by a specified stroke.

To put it more in detail, a support shaft 48 is inserted into the bearing hole 26b of the lock block 26 so as to slide in both rotary and axial directions, and the support bracket 47d is securely tightened to the projecting portion of the support shaft 48 by means of a nut 48a. Part of the support shaft 48 located inward in the vehicle width direction is positioned within an accommodation hole 26c formed in the lock block 26. A stop ring 48b is fitted to the inward end of the support shaft 48. The inward end is also provided with engage-stop grooves 48c, 48d spaced to correspond to the above-mentioned stroke. A ball 48e urged inward with a spring engages selectively with one of the engage-stop grooves 48c, 48d.

The armrest 47, when pulled outward in the vehicle width direction, moves outward; the stop ring 48b strikes against the bottom surface of the accommodation hole 26c, and the ball 48e is urged with a spring to engage with the engage-stop groove 48c and is held there with a click stop feeling. The armrest 47, when pushed inward in the vehicle width, moves inward; the ball 48e engages with the engage-stop groove 48d and is held there with a click stop feeling. At this time, the support shaft 48 does not project to the inside of the lock block 26.

The lower end of the leg portion 47a is supported with the side stretch portion 7a of the seat pipe 7 to be capable of engaging with or disengaging from that portion. To put it more in detail, a support pin 7e of a round bar shape is secured to the side stretch portion 7a so as to project in the vehicle width direction. An engage-stop pipe 47e of a cylindrical shape secured to the lower end of the leg portion 47a is made capable of engaging with or disengaging from the support pin 7e. Part of the engage-stop pipe 47e on its underside and inside in the vehicle width direction is formed with a cut 47f.

When the entire armrest 47 is pulled out in the vehicle width direction by the above-mentioned stroke, the engage-stop pipe 47e is disengaged from the support pin 7e by the amount of the cut 47f, so that the armrest 47 may be rotated about the support shaft 48.

As described above, since the support bracket 47d at the rear end of the arm portion 47b of the armrest 47 is supported with the back pipe 8 while its axial rotation movement about a lock block 26 and lateral movement are permitted and the lower end of the leg portion 47a is removable supported with the seat pipe 7, the armrest 47 may be turned upward about the support bracket 47d to make the side of the seat wide open, so that no obstacle is left in the way of a person getting on and off the wheelchair. Thus, the ease of getting on and off the wheelchair is improved.

Here, since it is arranged that the entire armrest 47 is moved outward in the vehicle width direction and then rotated rearward, interference with the vehicle frame when the armrest is rotated is prevented while placing the armrest in a position that is not too much outer side in the vehicle width direction in the state of normal use.

Moreover, since the cylindrical engage-stop pipe 47e is formed with the cut 47f, when the armrest 47 is to be returned to the original state, first the cut 47f portion comes into contact with the support pin 7e, and in that state the entire armrest has only to be pushed in the vehicle width direction, which is a simple operation.

In this embodiment as described above, since the bar handle is made in the gate shape in a double structure made up of the inner pipe 32 (securing part) and the outer member 33 (movable part) capable of displacing relative to the pipe 32, and the sensor 42 (displacement detecting means) is provided to detect the relative displacement between the securing part and the movable part, manual operation force is detected reliably with a simple constitution.

Since the outer member 33 is formed along the upper stretch portion of the inner pipe 32, the relative displacement is detected whatever position on the outer member 33 of the bar handle 5 may be pushed. An easy operation is possible for example by a single hand.

Furthermore, the type of detecting the relative displacement amount of the outer member 33 makes it possible to constitute so that the displacement of the outer member 33 is caused by a very small manual operation force depending on the setting of the force that urges the outer member toward the initial position. Therefore, it is possible to produce assisting power according to the intention of the nursing person, which is a great improvement in the ease of operation.

Since the sensor 42 is disposed in the center and the bearing members 25a for permitting the outer member 33 to move in the forward and rearward directions are provided on both right and left sides of the sensor 42, the detected relative displacement amount when either the right or left end of the outer member 33 is pressed for example to turn the wheelchair is smaller than the detected relative displacement amount when the central part of the outer member 33 is pressed. Therefore, the assisting power becomes smaller when turning, and so the turning operation is made easy.

Since the sensor 42 is disposed in the vehicle width center and the grips 36 are provided on both right and left sides of the outer member 33, the same relative displacement amount as that obtained when the central part is pressed is obtained by pressing the right and left grips 36, 36 with nearly equal forces when moving straight forward. Therefore, a required assisting power is obtained reliably with good ease of operation.

Since the right and left grips 36, 36 are disposed like non-parallel bars extending from right and left ends toward the center of the vehicle width with a weak upward gradient, the angles of the grips 36, 36 agree well with the palms of the nursing person, with further improvement in the ease of operation.

Since it is arranged that the drive motor 57 is controlled to rotate in the forward direction according to the relative displacement amount obtained by pressing the bar handle 5 and that the drive motor 57 is controlled to rotate in the reverse direction when the reverse switch 70b (first operating component) is turned on, ease of operation is good. That is, when a wheelie operation is made for example, relative displacement for the reverse movement cannot be detected, so that the problem of reverse rotation of the motor while there is no intention of moving reverse is avoided. When the wheelchair is to be moved reverse, the only thing required is to operate the reverse switch 70b, which is a very easy operation.

Since the operating means such as the reverse switch 70b, the power switch 70a, the speed controller 70c, the power display 71a, the charge requiring 71b, are disposed collectively in the vehicle width center of the outer member 33 of the bar handle 5, ease of operation and visibility of the operating means are improved. Since the electric components are collectively disposed in the central area, assembly work efficiency is improved.

Each of the rear wheels 49 is attached through a bracket 8c to the lower part 8b of the back pipe 8 of the right or left side frame 3. The rear wheel 49 is made up of an aluminum alloy cast wheel 50, comprising a cylindrical hub portion 50a, a ring-shaped rim portion 50c, with both of them joined into a single body through a disk portion 50b, and a tire 51 fitted on the rim portion 50c. The hub portion 50a is supported with a wheel shaft 53 through bearings 52, 52. The wheel shaft 53 is secured by tightening a nut 53a to the bracket 8c.

On the inside in the vehicle width direction of the wheel 50 is disposed a unit case 56 for attaching a drive unit 54 and a control unit 55. The boss portion 56a of the unit case 56 is secured as sandwiched between the hub portion 50a of the wheel 50 and the bracket 8c through the wheel shaft boss portion 56b formed integrally with the wheel shaft 53. A removable cover 62 covers a placing chamber 56c in which the control unit 55 is disposed.

The control unit 55 functions as an assisting power control means that controls the drive motor 57 to produce assisting power according to the relative displacement amount between the movable and fixed parts detected at the bar handle 5 and also as a means that controls the drive motor 57 in the reverse direction when the reverse switch 70b is turned on.

A cylindrical umbrella portion 56d is formed on the outer circumferential portion on the wheel 50 side of the unit case 56. Into the umbrella portion 56d is inserted an insert portion 50d formed cylindrically on the inside surface of the disk portion 50b. The outer circumferential portion of the base portion of the insert portion 50d is provided with an annular groove 50e to form a labyrinth structure to prevent rainwater or the like from entering inside.

The drive unit 54 is constituted with a planetary gear mechanism 58 connected to the output shaft 57a of an electric motor 57, and the output gear 59a of the output shaft 59 connected to the planetary gear mechanism 58 is made to mesh with a ring-shaped wheel gear 60 having internal teeth and secured to the inside end surface of the disk portion 50b. Both end portions of the output shaft 59 are supported with the unit case 56 through bearings 61a, 61b. To the end portion on the output shaft side of the motor 57 is fitted a motor support case 63 which is secured to the unit case 56 using tightening bolts.

The planetary gear mechanism 58 is disposed in a gear chamber 64 formed with the unit case 56 and the motor support case 63, and is made up of a sun gear 58a fitted to the motor output shaft 57a, three planetary gears 58b arranged to rotate around and mesh with the sun gear 58a, and a ring gear 58c having internal teeth meshing with the planetary gears 58b.

The planetary gears 58b are rotatably supported with a disk-shaped arm plate 58d disposed on the output shaft 59 side to be rotatably about the motor axis and with a ring-shaped arm plate 58e disposed on the motor side. The output shaft 59 is spline-fitted into the axial center of the arm plate 58d. Thus, the planetary gear mechanism 58 and the output shaft 59 are arranged on a single straight line, and the rotation of the arm plate 58d is transmitted from the output shaft 59 to the wheel 50.

The ring gear 58c is disposed to span both of the unit case 56 and the motor support case 63, is supported rotatably with both cases 56, 63, and is provided with a switching mechanism 65 which can stop the rotation of the ring gear 58c.

The switching mechanism 65 is constituted that the outer circumferential surface of the ring gear 58c is provided with plural, constantly spaced engage-stop recesses 58f, the motor support case 63 is provided with a pin 66 that can project and retract to engage with and disengage from the engage-stop recesses 58f, the pin 66 is urged toward the engage-stopping direction by a spring 67, and the pin 66 is also made movable in the disengaging direction by means of a cable 68.

The cable 68 is connected to a change-over switch 70d provided on the handle cover 34. When the switch 70d is turned to a normal position, the pin 66 engages with the recess 58f, the motor rotation is reduced with a specified reduction ratio and transmitted to the wheel 50. On the other hand, when the switch 70d is turned to a push-walk position, the pin 66 disengages from the recess 58f, and the rear wheel 49 is disconnected from the motor 57, so that the wheelchair may be easily pushed around by hand with power off.

The above point will be described more in detail: When the rotation of the ring gear 58c relative to the housing is disabled with the switching mechanism 65, the rotation of the electric motor 57 is reduced at a reduction ratio determined with the sun gear 57a, the planetary gear 58b, and the ring gear 58c, and outputted from the arm plate 58d to drive the rear wheel 49.

When the rotation of the ring gear 58c relative to the housing is permitted with the switching mechanism 65, the planetary gear mechanism 58 functions as a disengaged clutch. That is, when the wheelchair is moved manually in the state of the ring gear 58c being rotatably, the arm plate 58d rotates with the rotation of the rear wheel 49. At this time, since the sun gear 58a does not rotate due to the magnetic load of the motor 57, the planetary gear 56b, while revolving about its own axis and engaging with the sun gear 58a, rolls on the sun gear 58a along with the rotation of the arm plate 58d, and the rotation of the rear wheel 49 is transmitted to the ring gear 58c. However, since the ring gear 58c is free to rotate, only the ring gear 58c rotates in the state of the rear wheel 49 being disconnected from the motor 57. Therefore, the planetary gear mechanism 58 functions as a clutch in a disengaged state.

Thus, this embodiment requires no dedicated clutch mechanism and makes it possible to simplify constitution, reduce the number of components, and reduce the size and weight of the drive unit 54.

Since the motor shaft 57a and the output shaft 59 are disposed coaxially, the number of components such as shafts and bearings may be reduced to increase axial rigidity. Since the planetary gear 58b is supported with the bearings that also support the motor 57 and the output shaft 59, the dimension in the axial direction may be reduced.

FIGS. 27 to 30 are for explaining the embodiment of the according to claim 3. This embodiment is an example of arrangement for operating the above switching mechanism 65.

The arrangement for operating the above switching mechanism 65 is constituted with an operating mechanism 81 mounted from behind on part of the left back pipe 8 where the seat pipe 7 is connected, and a transmitting line made up of right and left cables 82a, 82b for transmitting the action of the operating mechanism 81 simultaneously to right and left switching mechanisms 65, 65.

The operating mechanism 81 is made up of a bracket 83 secured to the back pipe 8, an operating rod 84 supported for vertical sliding with the bracket 83, and an operating lever 86 connected rotatably to the operating rod 84 by means of a pin 85.

The bracket 83 is made as a single body by combining together a grip portion 83a having a U-shaped cross section and a box-like holding section 83b with its forward side open. The bracket 83 is secured to the back pipe 8 by fitting the grip portion 83a from behind onto the back pipe 8, inserting a bolt 87a at right angles, and engaging a nut 87b. Incidentally in this embodiment, a seat belt securing bolt also serves as the bolt 87a.

The rod 84 is supported for up and down movement with a boss portion 83c formed on the ceiling underside surface of the holding section 83b. A connecting plate 88 is connected and secured to the lower end of the operating rod 84, with an urging spring 89 interposed between the connecting plate 88 and the boss portion 83c. Thus, the rod 84 is urged downward, so that the rod 84 may be held, due to the position of the lever 86, in a position for propelled movement as shown in solid lines or in a position for manual movement as shown with phantom lines in FIG. 28.

Inner cables 82c of the right and left cables 82a, 82b are connected to the connecting plate 88. Outer cables 82d are secured to the bottom wall of the holding section 83b by tightening nuts engaging with length adjustment fittings 82e, so that the effective lengths of the outer cables 82d are adjustable.

The operating lever 86 is located between two ribs 83d, 83d formed on the top wall of the holding section 83b, and provided with a contact surface 86a for propelled movement and a contact surface 86b for manual movement, with both surfaces at about right angles to each other. Therefore, the operating lever 86 is rotatably about the connecting pin 85, so that it is held in a position in which the contact surface 86a or 86b is in contact with the upper surface of the top wall of the holding section 83b.

Since the dimension h2 from the manual movement-purpose contact surface 86b to the connecting pin 85 is set to be greater than the dimension h1 from the propelled movement-purpose contact surface 86a to the connecting pin 85, the operating rod 84 is lifted by the difference between the dimensions h2 and h1 when the operating lever 86 is rotated, and the amount of the lift is transmitted through the cables 82a, 82b to the switching mechanisms 65, 65.

For the normal movement, the operating lever 86 is turned to the propelled movement position shown in FIG. 28. Then, the dimension from the top wall surface of the holding section 83b to the connecting pin 85 becomes small h1, and the operating rod 84 lowers. The lowering movement is transmitted from the connecting plate 88 to the cables 82a, 82b, and to the switching mechanisms 65, 65, where the pin 66 engages with the engage-stop recess 58f, and the motor rotation is reduced by a specified reduction ratio, and transmitted to the rear wheel 49.

On the other hand, when the wheelchair 1 is to be moved by manual pushing, the operating lever 86 is turned to the manual movement position. Then the dimension from the top wall surface of the holding section 83b to the connecting pin 85 becomes great h2, and the operating rod 84 is lifted. The lifting movement is transmitted from the connecting plate 88 to the cables 82a, 82b, and to the switching mechanisms 65, 65, where the pin 66 disengages from the engage-stop recess 58f, the rear wheel 49 is disconnected from the motor 57, so that manual push handling with power supply off is made easy.

As described above, since this embodiment makes it possible to switch both of the right and left switching mechanisms 65 simultaneously by operating to rotate the single operating lever 86, constitution is simple, layout space is small, and the switching operation is very simple and easy.

INDUSTRIAL APPLICABILITY

According to the invention of claim 1, when the movement of the ring gear relative to the housing is held with the switching mechanism, the rotation of the electric motor is reduced by a reduction ratio determined with the sun gear, the planetary gear, and the ring gear, and outputted from the arm plate, so that the wheel is propelled with the output.

On the other hand, when the ring gear is permitted to rotate relative to the housing by means of the switching mechanism, the planetary gear mechanism serves as a disengaged clutch.

That is to say, when the vehicle is manually moved in the state of the ring gear being let rotatably, the arm plate is rotated with the rotation of the wheel. Since resistance against rotation of the sun gear is great at this time due to the load of magnetism of the motor, the planetary gear rolls on the sun gear along with the rotation of the arm plate while rotating about its own axis in the state of meshing the sun gear, and the rotation of the wheel is transmitted to the ring gear. However, since the ring gear is free to rotate, in effect the wheel is disconnected from the motor shaft, so that the planetary gear mechanism serves as a disengaged clutch.

As described above, since this invention makes a dedicated clutch unnecessary, the constitution is simplified, number of parts is reduced, and the drive unit is made light-weight and compact.

According to the invention of claim 2, since the motor shaft is disposed coaxially with the output shaft, the number of parts, such as shafts and bearings is reduced, and the axial rigidity is enhanced. It is also possible to support the planetary gear with the bearings that support the motor and the output shaft, the constitution is made with a small axial dimension.

According to the invention of claim 3, since the relative rotation of the right and left ring gears is held or permitted with the right and left switching mechanisms in response to the operation of the single operating mechanism, the clutch may be disengaged with simple operation even in case both of the right and left wheels are provided with planetary gear mechanisms, and the vehicle is easily moved in case of manual handling.

What is claimed is:

1. An electric motor-operated vehicle comprised of a frame, a pair of wheels journalled by said frame, a pair of electric motors carried by said frame and each having an output shaft, and a pair of transmissions for selectively driving a respective of said wheels from the respective one of said electric motor output shafts or permitting said wheel to free wheel relative to said output shaft, each of said transmissions comprising a planetary gear mechanism, said planetary gear mechanism having a sun gear element, at least one planetary gear element meshing with said sun gear element, a ring gear element meshing with said planetary gear element and a carrier plate element supporting planetary gear element for rotation, said output shaft being in continuous driving relationship with one of said planetary gear mechanism elements, another of said planetary gear mechanism elements being in continuous driving relation with the respective one of said wheels, each of said transmissions comprising a coupling element that selectively retains the associated ring gear element against rotation or permitting rotation thereof for selectively driving the associated wheel from said output shaft of the respective of said motors at a speed reduction ratio or permitting freewheeling of said wheel relative to said output shaft and an operation mechanism mounted on the vehicle frame, and a transmitting system for transmitting the action of the operation mechanism simultaneously to both coupling elements of said planetary gear mechanisms.

2. An electric motor-operated vehicle according to claim 1, wherein the output shaft drives the sun gear element.

3. An electric motor-operated vehicle according to claim 2, wherein the carrier plate element is in driving relation with the wheel.

4. An electric motor-operated vehicle according to claim 3, wherein the wheel is driven by a transmission output shaft connected to the carrier plate element coaxially with the axis of said plate element, a wheel gear fixed to an inside cylindrical surface of said wheel driven by an output gear formed on the transmission output shaft, the motor output shaft and the transmission output shaft are disposed coaxially.

5. An electric motor-operated vehicle according to claim 1, wherein each wheel is journalled on a stationary part of the vehicle in which the respective ring gear is also journalled, each of said ring gears having at least one locking detent opening juxtaposed to said vehicle stationary part forming a part of the coupling element of the respective wheel, each of said coupling elements further including a respective locking pin reciprocally supported in said vehicle stationary part and adapted to engage said locking detent opening of the associated wheel for restraining said ring gear from rotation for effecting a driving relation between the respective electric motor output shaft and wheel, said locking pins being actuated by a common operator.

6. An electric motor-operated vehicle according to claim 5, wherein the common operator actuates the locking pins through a respective one of a pair of wire transmitters.

7. An electric motor-operated vehicle according to claim 1, wherein each wheel is journalled on a stationary part of the vehicle in which the associated ring gear is also journalled, each of said ring gears having at least one locking detent opening juxtaposed to said vehicle stationary part forming a part of the respective of said coupling elements, said coupling elements further including a locking pin reciprocally supported in said vehicle stationary part and adapted to engage said locking detent opening for restraining said ring gear from rotation for effecting a driving relation between the electric motor output shaft and said wheel.

* * * * *